(12) United States Patent
Song et al.

(10) Patent No.: US 11,528,070 B2
(45) Date of Patent: *Dec. 13, 2022

(54) CHANNEL COMPRESSION MATRIX PARAMETERS

(71) Applicant: Lenovo (Singapore) PTE. LTD., New Tech Park (SG)

(72) Inventors: Jiho Song, Ulsan (KR); Tyler Brown, Lake Zurich, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 67 days.

This patent is subject to a terminal disclaimer.

(21) Appl. No.: 17/121,535

(22) Filed: Dec. 14, 2020

(65) Prior Publication Data

US 2021/0100162 A1 Apr. 8, 2021

Related U.S. Application Data

(63) Continuation of application No. 16/252,213, filed on Jan. 18, 2019, now Pat. No. 10,868,602.
(Continued)

(51) Int. Cl.
*H04B 7/06* (2006.01)
*A01D 34/416* (2006.01)
(Continued)

(52) U.S. Cl.
CPC ....... *H04B 7/0626* (2013.01); *A01D 34/4165* (2013.01); *A01D 43/16* (2013.01);
(Continued)

(58) Field of Classification Search
CPC ............... A01D 34/4165; A01D 43/16; A01D 2101/00; A01D 67/005; A01D 75/006;
(Continued)

(56) References Cited

U.S. PATENT DOCUMENTS

2012/0113866 A1* 5/2012 Tenny ................... H04W 24/10
370/254
2012/0113868 A1 5/2012 Cummings
(Continued)

FOREIGN PATENT DOCUMENTS

WO 2017168349 A1 10/2017

OTHER PUBLICATIONS

Motorola Mobility, Lenovo, "Discussion on higher rank Type II codebook and feedback overhead reduction", 3GPP TSG RAN WG1 #90 R1-1714217, Aug. 21-25, 2017, pp. 1-4.
(Continued)

*Primary Examiner* — Wei Zhao
(74) *Attorney, Agent, or Firm* — Kunzler Bean & Adamson

(57) ABSTRACT

One apparatus for providing high-resolution CSI feedback includes a processor and a radio transceiver. The processor computes sets of amplitude and phase parameters for one or more channel compression matrices. Here, each channel compression matrix corresponds to one transmission layer of a multiple-layer transmission, where each channel compression matrix is comprised of one or more column vectors. The radio transceiver sends indications of the sets of amplitude and phase parameters to one or more network entities is a mobile communication network.

20 Claims, 22 Drawing Sheets

Related U.S. Application Data

(60) Provisional application No. 62/619,635, filed on Jan. 19, 2018, provisional application No. 62/619,670, filed on Jan. 19, 2018.

(51) Int. Cl.

| | | |
|---|---|---|
| *A01D 43/16* | (2006.01) | |
| *A01D 67/00* | (2006.01) | |
| *A01D 75/00* | (2006.01) | |
| *H04B 7/10* | (2017.01) | |
| *A01D 101/00* | (2006.01) | |

(52) U.S. Cl.
CPC ......... *A01D 67/005* (2013.01); *A01D 75/006* (2013.01); *H04B 7/0617* (2013.01); *H04B 7/0619* (2013.01); *H04B 7/0695* (2013.01); *H04B 7/10* (2013.01); *A01D 2101/00* (2013.01)

(58) Field of Classification Search
CPC ........... H04W 36/001; H04W 36/0016; H04W 36/0069; H04W 36/08; H04W 24/10
See application file for complete search history.

(56) References Cited

U.S. PATENT DOCUMENTS

2018/0176898 A1\* 6/2018 Yu .......................... H04W 16/28
2018/0227096 A1\* 8/2018 Lim ...................... H04L 5/0048

OTHER PUBLICATIONS

Samsung, "On higher rank (3 and 4) Type II CSI", 3GPP TSG RAN WG1 NR Ad-Hoc#2 R1-1710674, Jun. 27-30, 2017, pp. 1-3.

Huawei, Hisilicon, "The remaining issues for Type II codebook", 3GPP TSG RAN WG1 NR Ad-Hoc Meeting R1-1710454, Jun. 27-30, 2017, pp. 1-7.

Samsung et al., "WF on Type I and II CSI codebooks", 3GPP TSG-RAN WG1 #89 R1-1709232, May 15-19, 2017, pp. 1-24.

Motorola Mobility et al., "Discussion on higher rank Type II codebook and feedback overhead reduction", 3GPP TSG RAN WG1 Meeting AH 1801 R1-1800730, Jan. 22-26, 2018, pp. 1-8.

\* cited by examiner

Initialization
1: Initialize beamspace matrix $\mathbf{H}_1^{BS} = \mathbf{H}(\mathbf{I}_2 \otimes \mathbf{B}) \in \mathbb{C}^{2N_{cs}W \times 2L}$

Iterative update
2: for $1 \leq r \leq R$
3: For given $\mathbf{G}_r \in \mathbb{C}^{2L \times \tilde{L}}$, compute compressed matrix $\mathbf{H}_r^{comp} = \mathbf{H}_r^{BS}\mathbf{G}_r \in \mathbb{C}^{2N_{cs}W \times \tilde{L}}$
4: Compute compressed basis combinin vector
$$\mathbf{w}_r^{opt} = \operatorname{argmax}_{\mathbf{\tilde{w}} \in \mathbb{C}_{amps}^{\tilde{L}}} \frac{\|\mathbf{H}_r^{comp}\mathbf{\tilde{w}}\|_2^2}{\|\mathbf{G}_r\mathbf{\tilde{w}}\|_2^2} = e_1((\mathbf{G}_r^H\mathbf{G}_r)^{-1}(\mathbf{H}_r^{comp})^H\mathbf{H}_r^{comp}) \in \mathbb{C}^{\tilde{L}}$$
5: Quantize amplitudes $\mathbf{a}_r = \operatorname{argmax}_{\mathbf{\tilde{a}} \in \mathbb{C}_{amps}^{\tilde{L}}} |\mathbf{\tilde{a}}^H|\mathbf{w}_r^{opt}|^2 / \|\mathbf{\tilde{a}}\|_2^2 \in \mathbb{R}_+^{\tilde{L}}$
6: Compute quantized basis combining vector $\mathbf{w}_r = \mathbf{a}_r \odot e^{j\angle \mathbf{w}_r^{opt}} \in \mathbb{C}^{\tilde{L}}$
7: Compute expanded basis combining vector $\mathbf{v}_r = \mathbf{G}_r\mathbf{w}_r / \|\mathbf{G}_r\mathbf{w}_r\|_2 \in \mathbb{C}^{2L}$
8: Update beamspace matrix $\mathbf{H}_{r+1}^{BS} = \mathbf{H}_r^{BS}(\mathbf{I}_{2L} - \mathbf{v}_r\mathbf{v}_r^H) \in \mathbb{C}^{2N_{cs}W \times 2L}$
9: end for

UE reports WB PMI
10: Selected beams $\mathbf{B} = [\mathbf{b}_1, \cdots, \mathbf{b}_L]$
11: Strongest coefficient out of $2L$ coefficients
12: Quantized amplitudes $\{\mathbf{a}_1, \cdots, \mathbf{a}_R\}$
13: Compression matrices $\{\mathbf{G}_1, \cdots, \mathbf{G}_R\}$

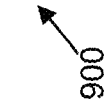

Fig. 9

Initialization

1: Initialize beamspace matrix $\mathbf{H}_1^{BS}[s] = \mathbf{H}[s](\mathbf{I} \otimes \mathbf{B}) \in \mathbb{C}^{2N_{rx}W/S \times 2L}$

Iterative update

2: for $1 \leq r \leq R$

3: For given $\mathbf{G}_r \in \mathbb{C}^{2L \times \tilde{L}}$, compute compressed matrix $\mathbf{H}_r^{comp}[s] = \mathbf{H}_r^{BS}[s]\mathbf{G}_r \in \mathbb{C}^{2N_{rx}W/S \times \tilde{L}}$ 4: Compute compressed basis combining vector
$\mathbf{w}_r^{opt}[s] = \operatorname{argmax}_{\tilde{\mathbf{w}} \in \mathbb{C}^{\tilde{L}}} \frac{\|\mathbf{H}_r^{comp}[s]\tilde{\mathbf{w}}\|_2^2}{\|\mathbf{G}_r\tilde{\mathbf{w}}\|_2^2} = e_1((\mathbf{G}_r^H\mathbf{G}_r)^{-1}(\mathbf{H}_r^{comp}[s])^H\mathbf{H}_r^{comp}[s]) \in \mathbb{C}^{\tilde{L}}$ 5: Quantize phases $\boldsymbol{\theta}_r[s] = \operatorname{argmin}_{\tilde{\boldsymbol{\theta}} \in \mathbb{C}_{phase}^{\tilde{L}}} \|\tilde{\boldsymbol{\theta}} - \angle \mathbf{w}_r^{opt}[s]\|_2^2 \in [0, 2\pi)^{\tilde{L}}$ 6: Quantize amplitudes $\mathbf{a}_r[s] = \operatorname{argmax}_{\tilde{\mathbf{a}} \in \mathbb{C}_{amp}^{\tilde{L}}} |(\mathbf{w}_r^{opt}[s])^H[s](\tilde{\mathbf{a}} \odot \mathbf{a}_r \odot e^{j\boldsymbol{\theta}_r[s]})|^2 / \|\tilde{\mathbf{a}} \odot \mathbf{a}_r \odot e^{j\boldsymbol{\theta}_r[s]}\|_2^2 \in \mathbb{R}^{\tilde{L}}$ 7: Compute quantized basis combining vector $\mathbf{w}_r[s] = \mathbf{a}_r[s] \odot \mathbf{a}_r \odot e^{j\angle\boldsymbol{\theta}_r[s]} \in \mathbb{C}^{\tilde{L}}$ 8: Compute expanded basis combining vector $\mathbf{v}_r[s] = \frac{\mathbf{G}_r\mathbf{w}_r[s]}{\|\mathbf{G}_r\mathbf{w}_r[s]\|_2} \in \mathbb{C}^{2L}$ 9: Update beamspace matrix $\mathbf{H}_{r+1}^{BS}[s] = \mathbf{H}_r^{BS}[s](\mathbf{I}_{2L} - \mathbf{v}_r^H[s]\mathbf{v}_r[s]) \in \mathbb{C}^{2N_{rx}W/S \times 2L}$ 10: end for

UE reports SB PMI

11: Quantized phases $\{\boldsymbol{\theta}_1[s], \cdots, \boldsymbol{\theta}_R[s]\}$ 12: Quantized amplitudes $\{\mathbf{a}_1[s], \cdots, \mathbf{a}_R[s]\}$

Final update at transmitter

13: Compute beamforming vector $\mathbf{f}_r[s] = (\mathbf{I}_2 \otimes \mathbf{B})\mathbf{v}_r[s] \in \mathbb{C}^{2N_{tx}}$ 14: Compute precoding matrix $\mathbf{F}[s] = [\mathbf{f}_1[s], \cdots, \mathbf{f}_R[s]]/\sqrt{R} \in \mathbb{C}^{2N_{tx} \times R}$

| CSI codebook type | Cell-edge throughput, bits/s/Hz/user | Mean throughput, bits/s/Hz/user | Feedback overhead, bits |
|---|---|---|---|
| Codebook 1 (Reference codebook) | 1.3112<br>0% | 4.1265<br>0% | 1071<br>0% |
| Codebook 2 | 1.2984<br>(-0.98%) | 4.0546<br>(-1.741%) | 809<br>(-24.463%) |
| Codebook I-A | 1.304<br>(-0.556%) | 4.1156<br>(-0.262%) | 765<br>(-28.571%) |
| Codebook II-A | 1.2989<br>(-0.943%) | 4.087<br>(-0.957%) | 737<br>(-31.186%) |
| Codebook III-A | 1.2982<br>(-0.993%) | 4.0529<br>(-1.782%) | 719<br>(-32.866%) |
| Codebook I-B | 1.2087<br>(-7.824%) | 3.8091<br>(-7.69%) | 459<br>(-57.143%) |
| Codebook II-B | 1.1934<br>(-8.985%) | 3.752<br>(-9.075%) | 403<br>(-62.372%) |
| Codebook III-B | 1.1478<br>(-12.463%) | 3.6083<br>(-12.558%) | 343<br>(-67.974%) |

| CSI codebook type | Cell-edge throughput, bits/s/Hz/user | Mean throughput, bits/s/Hz/user | Feedback overhead, bits |
|---|---|---|---|
| Codebook 1 (Reference codebook) | 1.8564 <br> 0% | 4.8247 <br> 0% | 1071 <br> 0% |
| Codebook 2 | 1.8362 <br> (-1.091%) | 4.701 <br> (-2.564%) | 809 <br> (-24.463%) |
| Codebook I-A | 1.8492 <br> (-0.388%) | 4.7807 <br> (-0.913%) | 765 <br> (-28.571%) |
| Codebook II-A | 1.8451 <br> (-0.611%) | 4.755 <br> (-1.444%) | 737 <br> (-31.186%) |
| Codebook III-A | 1.8347 <br> (-1.171%) | 4.7027 <br> (-2.529%) | 719 <br> (-32.866%) |
| Codebook I-B | 1.7406 <br> (-6.238%) | 4.4269 <br> (-8.245%) | 459 <br> (-57.143%) |
| Codebook II-B | 1.7205 <br> (-7.32%) | 4.363 <br> (-9.569%) | 403 <br> (-62.372%) |
| Codebook III-B | 1.6465 <br> (-11.308%) | 4.1892 <br> (-13.172%) | 343 <br> (-67.974%) |

| Feedback overhead | WB | | | | SB | |
| --- | --- | --- | --- | --- | --- | --- |
| | Layer common | | Layer specific | | Layer specific | |
| | Oversampling | L Beam selection | Strongest beam | WB amplitude | SB amplitude | SB phase |
| Layer 1 | | | 3 | 21 | 5S | 19S |
| Layer 2 | 4 | 11 | 3 | 21 | 5S | 19S |
| Layer 3 | | | 3 | 21 | 5S | 19S |
| Layer 4 | | | 3 | 21 | 5S | 19S |
| Total R Layers | 4 | 11 | 3R | 21R | 5RS | 19RS |

Figure 13B

| Feedback overhead | WB | | | | | SB | |
| --- | --- | --- | --- | --- | --- | --- | --- |
| | Layer common | | Layer specific | | | Layer specific | |
| | Oversampling | L Beam selection | 2 Beam selection | Strongest beam | WB amplitude | SB amplitude | SB phase |
| Layer 1 | | | NA | 3 | 21 | 5S | 19S |
| Layer 2 | 4 | 11 | NA | 3 | 21 | 5S | 19S |
| Layer 3 | | | 2 | 2 | 9 | 3S | 9S |
| Layer 4 | | | 2 | 2 | 9 | 3S | 9S |
| Total R Layers | 4 | 11 | R | 2.5R | 15R | 4RS | 14RS |

| Feedback overhead | Layer common | | WB | | | | | | SB | | |
|---|---|---|---|---|---|---|---|---|---|---|---|
| | | | Layer specific | | | | | | | | |
| | Over sampling | L Beam selection | 1st col. vector | | | 2nd col. vector | | | Strongest beam | WB amp | SB amp | SB phase |
| | | | $\hat{p}$ | $\hat{a}_h, \hat{a}_v$ | $\hat{\theta}_h, \hat{\theta}_v$ | $\hat{p}$ | $\hat{a}_h, \hat{a}_v$ | $\hat{\theta}_h, \hat{\theta}_v$ | | | | |
| Layer 1 | | | NA | NA | NA | NA | NA | NA | 3 | 21 | 5S | 19S |
| Layer 2 | 4 | 11 | NA | NA | NA | NA | NA | NA | 3 | 21 | 5S | 19S |
| Layer 3 | | | 2 | 12 | 21 | 2 | 12 | 14 | (2,2,1) | 3 | S | 3S |
| Layer 4 | | | 2 | 12 | 21 | 2 | 12 | 14 | (2,2,1) | 3 | S | 3S |
| Total R Layers | 4 | 11 | R | 6R | 10.5R | R | 6R | 7R | 4R | 12R | 3RS | 11RS |

Figure 13C

| Feedback overhead | Layer common | | WB | | | | | | SB | | |
|---|---|---|---|---|---|---|---|---|---|---|---|
| | | | Layer specific | | | | | | | | |
| | Over sampling | L Beam selection | 1st col. vector | | | 2nd col. vector | | | Strongest beam | WB amp | SB amp | SB phase |
| | | | $\hat{p}$ | $\hat{a}$ | $\hat{\theta}_h, \hat{\theta}_v$ | $\hat{p}$ | $\hat{a}$ | $\hat{\theta}_h, \hat{\theta}_v$ | | | | |
| Layer 1 | | | NA | NA | NA | NA | NA | NA | 3 | 21 | 5S | 19S |
| Layer 2 | 4 | 11 | NA | NA | NA | NA | NA | NA | 3 | 21 | 5S | 19S |
| Layer 3 | | | 2 | 6 | 21 | 2 | 6 | 14 | (2,1) | 3 | S | 3S |
| Layer 4 | | | 2 | 6 | 21 | 2 | 6 | 14 | (2,1) | 3 | S | 3S |
| Total R Layers | 4 | 11 | R | 3R | 10.5R | R | 3R | 7R | 3R | 12R | 3RS | 11RS |

Figure 13D

| Feedback overhead | Layer common | | WB | | | | | | | | SB | | |
|---|---|---|---|---|---|---|---|---|---|---|---|---|---|
| | | | Layer specific | | | | | | | | | | |
| | Over sampling | L Beam selection | 1st col. vector | | | | 2nd col. vector | | | | Strongest beam | WB amp | SB amp | SB phase |
| | | | $\hat{p}$ | $\hat{\phi}$ | $\hat{a}$ | $\hat{\theta}$ | $\hat{p}$ | $\hat{\phi}$ | $\hat{a}$ | $\hat{\theta}$ | | | | |
| Layer 1 | | | NA | NA | NA | NA | NA | NA | NA | NA | 3 | 21 | 5S | 19S |
| Layer 2 | 4 | 11 | NA | NA | NA | NA | NA | NA | NA | NA | 3 | 21 | 5S | 19S |
| Layer 3 | | | 2 | 3 | 6 | 9 | 2 | 2 | 6 | 6 | (2,1) | 3 | S | 3S |
| Layer 4 | | | 2 | 3 | 6 | 9 | 2 | 2 | 6 | 6 | (2,1) | 3 | S | 3S |
| Total R Layers | 4 | 11 | R | 1.5R | 3R | 4.5R | R | R | 3R | 3R | 3R | 12R | 3RS | 11RS |

Figure 13E

| Feedback overhead | WB | | | | | | | | | SB | | |
|---|---|---|---|---|---|---|---|---|---|---|---|---|
| | Layer common | | Layer specific | | | | | | | | | |
| | Over sampling | L Beam selection | 1st col. vector | | | 2nd col. vector | | | Strongest beam | WB amp | SB amp | SB phase |
| | | | $\hat{p}$ | $\hat{a}_h, \hat{a}_v$ | $\hat{\theta}_h, \hat{\theta}_v$ | $\hat{p}$ | $\hat{a}_h, \hat{a}_v$ | $\hat{\theta}_h, \hat{\theta}_v$ | | | | |
| Layer 1 | | | 2 | 12 | 21 | 2 | 12 | 14 | (2,2,1) | 3 | S | 3S |
| Layer 2 | 4 | 11 | 2 | 12 | 21 | 2 | 12 | 14 | (2,2,1) | 3 | S | 3S |
| Layer 3 | | | 2 | 12 | 21 | 2 | 12 | 14 | (2,2,1) | 3 | S | 3S |
| Layer 4 | | | 2 | 12 | 21 | 2 | 12 | 14 | (2,2,1) | 3 | S | 3S |
| Total R Layers | 4 | 11 | 2R | 12R | 21R | 2R | 12R | 14R | 5R | 3R | RS | 3RS |

Figure 13F

| Feedback overhead | WB | | | | | | | | | SB | | |
|---|---|---|---|---|---|---|---|---|---|---|---|---|
| | Layer common | | Layer specific | | | | | | | | | |
| | Over sampling | L Beam selection | 1st col. vector | | | 2nd col. vector | | | Strongest beam | WB amp | SB amp | SB phase |
| | | | $\hat{p}$ | $\hat{a}$ | $\hat{\theta}_h, \hat{\theta}_v$ | $\hat{p}$ | $\hat{a}$ | $\hat{\theta}_h, \hat{\theta}_v$ | | | | |
| Layer 1 | | | 2 | 6 | 21 | 2 | 6 | 14 | (2,1) | 3 | S | 3S |
| Layer 2 | 4 | 11 | 2 | 6 | 21 | 2 | 6 | 14 | (2,1) | 3 | S | 3S |
| Layer 3 | | | 2 | 6 | 21 | 2 | 6 | 14 | (2,1) | 3 | S | 3S |
| Layer 4 | | | 2 | 6 | 21 | 2 | 6 | 14 | (2,1) | 3 | S | 3S |
| Total R Layers | 4 | 11 | 2R | 6R | 21R | 2R | 6R | 14R | 3R | 3R | RS | 3RS |

Figure 13G

| Feedback overhead | WB | | | | | | | | | | | SB | | |
|---|---|---|---|---|---|---|---|---|---|---|---|---|---|---|
| | Layer common | | Layer specific | | | | | | | | | | | |
| | Over sampling | L Beam selection | 1st col. vector | | | | 2nd col. vector | | | | Strongest beam | WB amp | SB amp | SB phase |
| | | | $\hat{p}$ | $\hat{\phi}$ | $\hat{a}$ | $\hat{\theta}$ | $\hat{p}$ | $\hat{\phi}$ | $\hat{a}$ | $\hat{\theta}$ | | | | |
| Layer 1 | | | 2 | 3 | 6 | 9 | 2 | 2 | 6 | 6 | (2,1) | 3 | S | 3S |
| Layer 2 | 4 | 11 | 2 | 3 | 6 | 9 | 2 | 2 | 6 | 6 | (2,1) | 3 | S | 3S |
| Layer 3 | | | 2 | 3 | 6 | 9 | 2 | 2 | 6 | 6 | (2,1) | 3 | S | 3S |
| Layer 4 | | | 2 | 3 | 6 | 9 | 2 | 2 | 6 | 6 | (2,1) | 3 | S | 3S |
| Total R Layers | 4 | 11 | 2R | 3R | 6R | 9R | 2R | 2R | 6R | 6R | 3R | 3R | RS | 3RS |

Figure 13H

CHANNEL COMPRESSION MATRIX PARAMETERS

CROSS-REFERENCE TO RELATED APPLICATIONS

This application claims priority to U.S. patent application Ser. No. 16/252,213 titled "Channel Compression Matrix Parameters" and filed on Jan. 18, 2019 for Jiho Song and Tyler Brown, now U.S. Pat. No. 10,868,602, which claims priority to U.S. Provisional Patent Application No. 62/619,670 entitled "Method and Apparatus for Higher-Rank High-Resolution Channel State Information Codebook in FD-MIND Systems" and filed on Jan. 19, 2018 for Jiho Song and Tyler Brown, and also to U.S. Provisional Patent Application No. 62/619,635 entitled "Method and Apparatus for Higher-Rank High-Resolution Channel State Information Codebook in FD-MIND Systems" and filed on Jan. 19, 2018 for Jiho Song and Tyler Brown, which applications are incorporated herein by reference.

FIELD

The subject matter disclosed herein relates generally to wireless communications and more particularly relates to efficiently providing high-resolution CSI feedback.

BACKGROUND

The following abbreviations are herewith defined, at least some of which are referred to within the following description.

The following abbreviations are herewith defined, at least some of which are referred to within the following description: Third Generation Partnership Project ("3GPP"), Fifth-Generation Core ("5GC"), Access and Mobility Management Function ("AMF"), Access Point Name ("APN"), Access Stratum ("AS"), Bandwidth Adaptation ("BA"), Bandwidth Part ("BWP"), Block Error Rate ("BLER"), Carrier Aggregation ("CA"), Cell-Specific Radio Network Temporary Identifier ("C-RNTI"), Clear Channel Assessment ("CCA"), Cyclic Prefix ("CP"), Control Element ("CE"), Cyclical Redundancy Check ("CRC"), Channel State Information ("CSI"), Common Search Space ("CSS"), Data Radio Bearer ("DRB," e.g., carrying user plane data), Demodulation Reference Signal ("DM-RS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Evolved Node B ("eNB"), Evolved Packet Core ("EPC"), Evolved UMTS Terrestrial Radio Access Network ("E-UTRAN"), Frame Based Equipment ("FBE"), Frequency Division Duplex ("FDD"), Frequency Division Multiple Access ("FDMA"), Frequency Division Orthogonal Cover Code ("FD-OCC"), Guard Period ("GP"), General Packet Radio Service ("GPRS"), Global System for Mobile Communications ("GSM"), Load Based Equipment ("LBE"), Listen-Before-Talk ("LBT"), Logical Channel ("LCH"), Long Term Evolution ("LTE"), Multiple Access ("MA"), Medium Access Control ("MAC"), Master Cell Group ("MCG"), Modulation Coding Scheme ("MCS"), Mobility Management Entity ("MME"), Multiple Input Multiple Output ("MIMO"), Multi User Shared Access ("MUSA"), Narrowband ("NB"), Next Generation (e.g., 5G) Node-B ("gNB"), Next Generation Radio Access Network ("NG-RAN"), New Radio ("NR", e.g., 5G radio access), Non-Orthogonal Multiple Access ("NOMA"), Orthogonal Frequency Division Multiplexing ("OFDM"), Packet Data Convergence Protocol ("PDCP"), Primary Cell ("PCell"), Physical Broadcast Channel ("PBCH"), Packet Data Network ("PDN"), Protocol Data Unit ("PDU"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Link Control ("RLC"), Radio Link Failure ("RLF"), Radio Link Monitoring ("RLM"), Radio Resource Control ("RRC"), Random-Access Procedure ("RACH"), Random Access Response ("RAR"), Radio Network Temporary Identifier ("RNTI"), Reference Signal ("RS"), Reference Signal Received Power ("RSRP"), Remaining Minimum System Information ("RMSI"), Resource Block Assignment ("RBA"), Resource Spread Multiple Access ("RSMA"), Round Trip Time ("RTT"), Receive ("RX"), Sparse Code Multiple Access ("SCMA"), Signaling Radio Bearer ("SRB," e.g., carrying control plane data), Single Carrier Frequency Division Multiple Access ("SC-FDMA"), Secondary Cell ("SCell"), Secondary Cell Group ("SCG"), Shared Channel ("SCH"), Signal-to-Interference-Plus-Noise Ratio ("SINK"), Serving Gateway ("SGW"), Service Data Unit ("SDU"), Sequence Number ("SN"), Session Management Function ("SMF"), System Information Block ("SIB"), Synchronization Signal ("SS"), Transport Block ("TB"), Transport Block Size ("TBS"), Time-Division Duplex ("TDD"), Time Division Multiplex ("TDM"), Time Division Orthogonal Cover Code ("TD-OCC"), Transmission Time Interval ("TTI"), Transmit ("TX"), Uplink Control Information ("UCI"), User Entity/Equipment (Mobile Terminal) ("the UE"), Uplink ("UL"), User Plane ("UP"), Universal Mobile Telecommunications System ("UMTS"), Uplink Pilot Time Slot ("UpPTS"), Wireless Local Area Network ("WLAN"), and Worldwide Interoperability for Microwave Access ("WiMAX").

In an effort to enhance system performance in 3GPP networks, more recent standards have looked at different forms of spatial diversity including different forms of multiple input multiple output ("MIMO") systems, which involve the use of multiple antennas at each of the source and the destination of the wireless communication for multiplying the capacity of the radio link through the use of multipath propagation. Such a system makes increasingly possible the simultaneous transmission and reception of more than one data signal using the same radio channel.

As part of supporting MIMO communications, user equipment can make use of channel state information codebooks, which help to define the nature of the adopted beams, which are used to support a particular data connection. Higher rank codebooks can sometimes be used to enhance system performance, but often at the price of an increase in the amount of feedback overhead. In 3GPP networks, a high-resolution channel state information ("CSI") codebook, e.g., Type II CSI codebook is used to support full-dimension ("FD") multiple-input multiple-output ("MIMO') systems. Through system-level simulations, it is verified that the rank 1-2 Type II CSI codebook provides improved data-rate performance compared to previous Release 14 CSI codebooks.

Although the rank 1-2 Type II CSI codebook shows improved data-rate throughput, it is necessary to support higher-rank transmission to exploit the full benefits of multiplexing gain and multiuser diversity gain. Moreover, it is required to compute high-resolution CSI to suppress inter-layer and inter-user interferences effectively.

BRIEF SUMMARY

Methods for efficiently providing high-resolution CSI feedback are disclosed. Apparatuses and systems also perform the functions of the methods.

One method (e.g., performed by a UE) for efficiently providing high-resolution CSI feedback includes computing sets of amplitude and phase parameters for one or more channel compression matrices, where each channel compression matrix corresponds to one transmission layer of a multiple-layer transmission and where each channel compression matrix is comprised of one or more column vectors. The method includes sending indications of the sets of amplitude and phase parameters to one or more network entities is a mobile communication network.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 9 is a diagram illustrating one embodiment of an algorithm for a wideband quantizer based on a channel compressing procedure;

FIG. 10 is a diagram illustrating one embodiment of an algorithm for a subband quantizer based on a channel compressing procedure;

FIG. 11A is a diagram illustrating one embodiment of data rate performance of CSI codebooks for $\lambda_{traffic}=3.5$;

FIG. 12A is a diagram illustrating another embodiment of data rate performance of CSI codebooks for $\lambda_{traffic}=2.0$;

FIG. 13A is a diagram illustrating one embodiment of feedback overhead for a Codebook 1 for rank 1-4 transmissions;

FIG. 13B is a diagram illustrating one embodiment of feedback overhead for a Codebook 2 for rank 1-4 transmissions;

FIG. 13C is a diagram illustrating one embodiment of feedback overhead for a Codebook I-A for rank 1-4 transmissions;

FIG. 13D is a diagram illustrating one embodiment of feedback overhead for a Codebook II-A for rank 1-4 transmissions;

FIG. 13E is a diagram illustrating one embodiment of feedback overhead for a Codebook III-A for rank 1-4 transmissions;

FIG. 13F is a diagram illustrating one embodiment of feedback overhead for a Codebook I-B for rank 1-4 transmissions;

FIG. 13G is a diagram illustrating one embodiment of feedback overhead for a Codebook II-B for rank 1-4 transmissions;

FIG. 13H is a diagram illustrating one embodiment of feedback overhead for a Codebook III-B for rank 1-4 transmissions;

DETAILED DESCRIPTION

Figure 1:
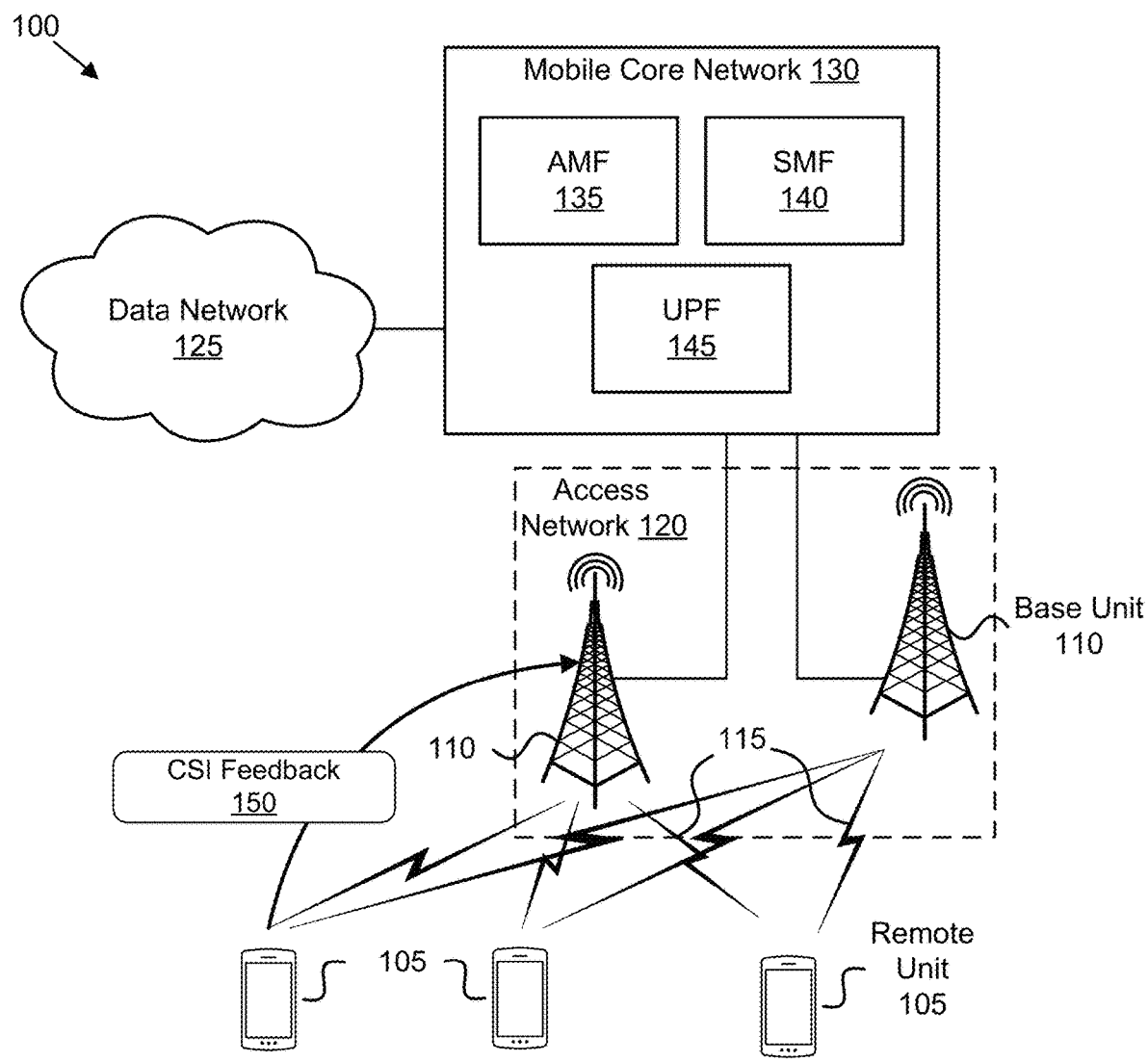
FIG. 1 is a schematic block diagram illustrating one embodiment of a wireless communication system for efficiently providing high-resolution CSI feedback.

Throughout this disclosure, $\mathbb{C}$ denotes the field of complex numbers, $\mathbb{R}$ denotes the field of real numbers, $\|\bullet\|_p$ is the p-norm, $\|\bullet\|_F$ is the Frobenius norm, $\odot$ is the Hadamard product, $\otimes$ is the Kronecker product, $a^H$ is the conjugate transpose of the column vector a, $0_{a \times b}$ is the a×b all zeros matrix, $I_N$ is the N×N identity matrix, $\mathfrak{v}_\ell\{A\}$ denotes the $\ell$-th dominant right singular vector of the matrix A, $\lambda_\ell\{A\}$ denotes the $\ell$-th singular value of the matrix A, and $e_\ell\{A\}$ denotes the $\ell$-th eigenvector of the matrix A.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

In order to fully exploit the benefits of multiuser (MU) full-dimension (FD) multiple-input multiple-output (MIMO) systems, it is necessary to support higher rank MU transmission to benefit from multiplexing gain and multiuser diversity gain. Moreover, it is required to compute high-resolution channel state information (CSI) to effectively suppress inter-layer and inter-user interferences. The present disclosure describes a high-resolution CSI codebook that can support higher rank transmission (e.g., rank 1-4 transmission) with less feedback overhead compared to the previously reported CSI codebooks.

Previously reported Type II codebook (e.g., for rank 1-2 transmission scenario) give improved data-rate performances compared to 3GPP Rel 14 codebooks, although at the cost of a large total feedback overhead. Extending the current rank 1-2 Type II codebook to rank 1-4 transmission scenario increases the system performances at the cost of huge feedback overhead, which is not practical. The simple extension of the current Type II codebook would cause a huge burden on feedback links because the feedback overhead increases proportionally to the number of maximum transmission ranks. To provide increases system performance while reducing feedback overhead, the present disclosure describes channel compressing techniques and suitable CSI quantizers providing a practical high-resolution CSI codebook supporting rank 1-4 transmissions.

FIG. 1 depicts a wireless communication system 100 for efficiently providing high-resolution CSI feedback, according to embodiments of the disclosure. In one embodiment, the wireless communication system 100 includes at least one remote unit 105, an access network 120 containing at least one base unit 110, wireless communication links 115, and a mobile core network 130. The access network 120 and mobile core network 130 form a mobile communication network. Even though a specific number of remote units 105, access networks 120, base units 110, wireless communication links 115, and mobile core networks 130 are depicted in FIG. 1, one of skill in the art will recognize that any number of remote units 105, access networks 120, base units 110, wireless communication links 115, and mobile core networks 130 may be included in the wireless communication system 100. In another embodiment, the access network 120 contains one or more WLAN (e.g., Wi-Fi™) access points.

In one implementation, the wireless communication system 100 is compliant with the 5G system specified in the 3GPP specifications (e.g., "5G NR"). More generally, however, the wireless communication system 100 may implement some other open or proprietary communication network, for example, LTE or WiMAX, among other networks. Network environments often involve one or more sets of standards, which each define various aspects of any communication connection being made when using the corresponding standard within the network environment. Examples of developing and/or existing standards include new radio access technology (NR), Long Term Evolution (LTE), Universal Mobile Telecommunications Service (UMTS), Global System for Mobile Communication (GSM), and/or Enhanced Data GSM Environment (EDGE). The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a wireless device, or by other terminology used in the art.

The remote units 105 may communicate directly with one or more of the base units 110 in the access network 120 via uplink ("UL") and downlink ("DL") communication signals. Furthermore, the UL and DL communication signals may be carried over the wireless communication links 115. Here, the access network 120 is an intermediate network that provides the remote units 105 with access to services in the mobile core network 130.

The base units 110 may be distributed over a geographic region. In certain embodiments, a base unit 110 may also be referred to as an access terminal, an access point, a base, a base station, a Node-B, an eNB, a gNB, a Home Node-B, a relay node, a device, or by any other terminology used in the art. The base units 110 are generally part of a radio access network ("RAN"), such as the access network 120, that may include one or more controllers communicably coupled to one or more corresponding base units 110. These and other elements of the radio access network are not illustrated, but are well known generally by those having ordinary skill in the art. The base units 110 connect to the mobile core network 130 via the access network 120.

The base units 110 may serve a number of remote units 105 within a serving area, for example, a cell or a cell sector via a wireless communication link 115. The base units 110 may communicate directly with one or more of the remote units 105 via communication signals. Generally, the base units 110 transmit downlink ("DL") communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

In one embodiment, the mobile core network 130 is a 5G core ("5GC") or the evolved packet core ("EPC"), which may be coupled to other data network 125, like the Internet and private data networks, among other data networks. Each mobile core network 130 belongs to a single public land mobile network ("PLMN"). The present disclosure is not intended to be limited to the implementation of any particular wireless communication system architecture or protocol.

The mobile core network 130 includes several network functions ("NFs"). As depicted, the mobile core network 130 includes an access and mobility management function ("AMF") 135, a session management function ("SMF") 140, and a user plane function ("UPF") 145. The AMF 135 provides services such as UE registration, UE connection management, and UE mobility management. The SMF 140 manages the data sessions of the remote units 105, such as a PDU session. The UPF 145 provides user plane (e.g., data) services to the remote units 105. A data connection, e.g., a "PDU session" between the remote unit 105 and a data network 125 is managed by a UPF 145.

Although specific numbers and types of network functions are depicted in FIG. 1, one of skill in the art will recognize that any number and type of network functions may be included in the mobile core network 130. Moreover, where the mobile core network 130 is an EPC, the depicted network functions may be replaced with appropriate EPC entities, such as an MME, S-GW, P-GW, HSS, and the like. In certain embodiments, the mobile core network 130 may include a AAA server.

In various embodiments, the mobile core network 130 supports different types of mobile data connections and different types of network slices, wherein each mobile data connection utilizes a specific network slice. Here, a "network slice" refers to a portion of the mobile core network 130 optimized for a certain traffic type or communication service. In certain embodiments, the various network slices may include separate instances of network functions, such as the SMF 140 and UPF 145. In some embodiments, the different network slices may share some common network functions, such as the AMF 135. The different network slices are not shown in FIG. 1 for ease of illustration, but their support is assumed.

While FIG. 1 depicts components of a 5G RAN and a 5G core network, the described embodiments for efficiently providing high-resolution CSI feedback apply to other types of communication networks, including IEEE 802.11 variants, UMTS, LTE variants, CDMA 2000, Bluetooth, and the like. For example, in an LTE variant, the AMF 135 may be mapped to an MME, the SMF 140 may be mapped to a control plane portion of a PGW, the UPF 145 may be mapped to a STW and a user plane portion of the PGW, etc.

A base unit 110, one example of a network entity, may transmit reference signals used by the remote unit 105 to identify the channel state. To support spatial multiplexing and/or MU-MIMO, the remote unit 105 provides CSI feedback 150 to the base unit 110, e.g., using a Type II codebook. The remote unit 105 selects a codeword from the CSI codebook to transmit to the network (e.g., the base unit 110). To enjoy the full benefits of multiplexing gain and multi-user diversity gain, the system 100 supports higher-ranked transmission, such as rank 1-4 transmissions.

As discussed above, simply extending the current rank 1-2 Type II codebook to support higher-rank transmissions is not feasible because such an extension would result in huge increases in the total feedback overhead. In various embodiments, the remote unit 105 uses one of the channel compression techniques described herein to compute high-resolution CSI with less feedback overhead compared to the current Type II codebook. The remote unit 105 may also use the quantizers described herein in conjunction with the channel compression techniques to compute high-resolution CSI.

Considering a four-layer transmission, empirical studies show that most of the channel gains are the directions of the first and second transmission layers, while small amount of gains are contained in the directions of third and fourth transmission layers. To maximize the system throughput when considering limited feedback resources, the higher-rank CSI codebooks disclosed herein dedicate more feedback overhead for quantizing beamformers in the first and second transmission layers, at the expense of less feedback overhead for quantizing beamformer's in the third and fourth transmission layers. In various embodiments, for the third and fourth transmission layers, only a few dominant beams among L selected beams in set B are used to compute wideband and subband pre-coder matrix indices ("PMI"), thereby reducing feedback overhead for the third and fourth transmission layers. Here, L represents the number of beams and B is the set of L discrete Fourier transform ("DFT") beams.

Figure 2:
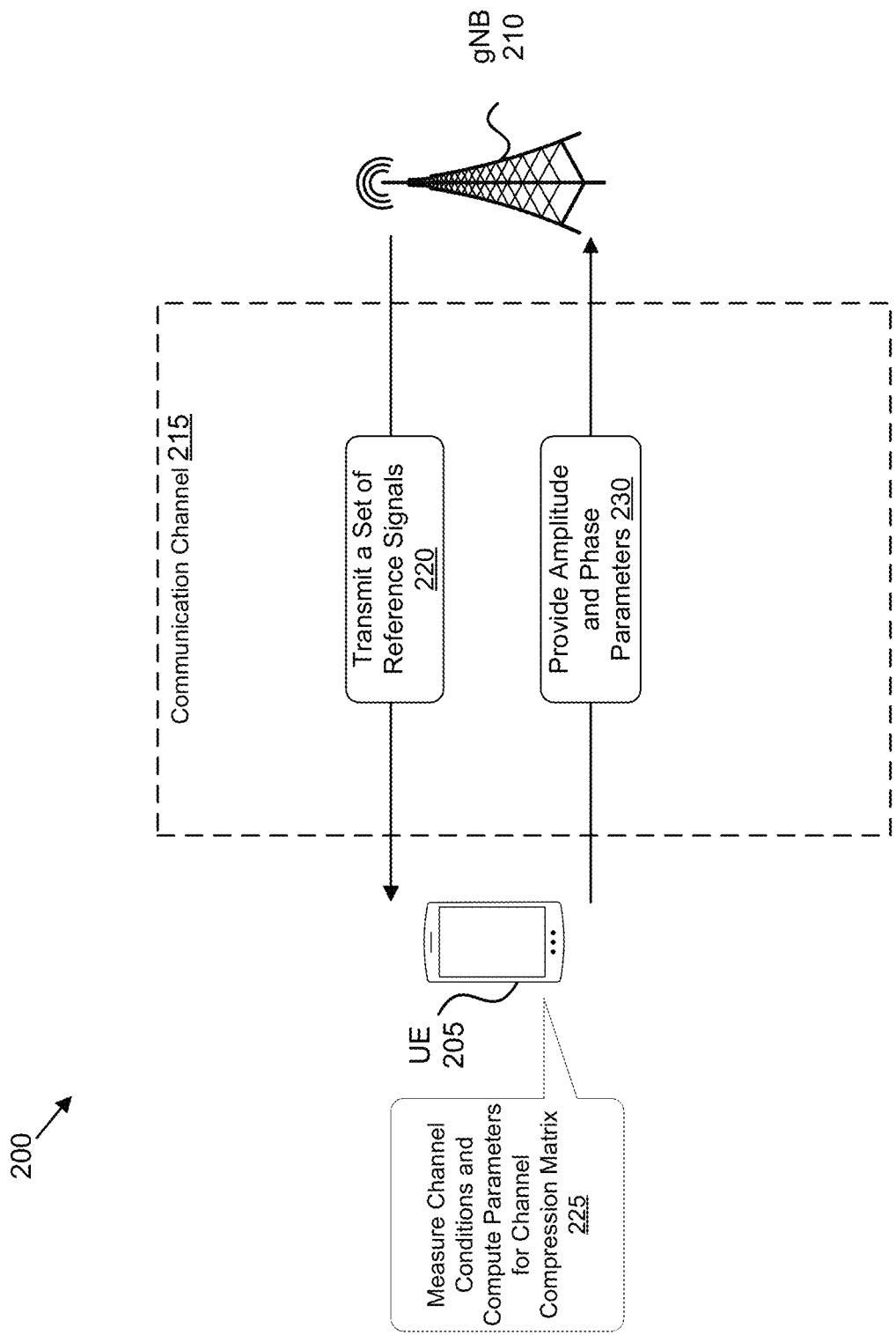
FIG. 2 illustrates one embodiment of a network architecture for efficiently providing high-resolution CSI feedback.

FIG. 2 depicts a network architecture 200 used for efficiently coding a CSI codebook and preparing a codeword therefrom, according to embodiments of the disclosure. The network architecture 200 may be a simplified embodiment of the wireless communication system 100. As depicted, the network architecture 200 includes a UE 205 in communication with a gNB 210. The UE 205 may be one embodiment of a remote unit 105 and the gNB 210 may be one embodiment of the base unit 110, described above. Here, the gNB 210 uses spatial multiplexing when communicating with the UE, where multiple transmission layers are transmitted, each layer having multiple beams.

As depicted, the gNB 210 transmits, on the downlink, various reference signals ("RS"), including beamformed channel state information reference signals ("CSI-RS") (see signaling 220). These signals pass through the communication channel 215, e.g., the physical transmission medium. As the signals pass through the communication channel 215, they gradually weaken and encounter objects which alter their paths and degrade the signals. Upon receiving the downlink signals, the UE 205 measures the channel conditions (e.g., the "channel state") based on the received reference signals (see block 225). Upon measuring the channel conditions, the UE 205 computes parameters (e.g., amplitude and phase parameters) for one or more channel compression matrices (see block 225).

The UE 205 provides channel state information ("CSI") feedback to the gNB 210, specifically, the UE 205 provides amplitude and phase parameters to the gNB to 10 (see signaling 230). In various embodiments, the UE 205 selects a codeword from the CSI codebook based on the measured channel conditions, and transmits the codeword to the gNB 210. In some embodiments, the UE 205 provides the amplitude and phase parameters by selecting one codeword from a Type II Codebook to provide CSI feedback. In various embodiments, gNB 210 determines an optimum precoding matrix for the current channel conditions based on the CSI feedback (e.g., based on the UE's codeword/recommendation).

As used herein, a set of CSI codewords makes up the CSI codebook. The set of codewords in the CSI codebook may be parameterized by a set of parameters such that every combination of the parameters corresponds to codewords, and the set of codewords that are generated by all combinations of the parameters is the codebook. These parameters may be represented using bits, integers, or other values in a range (e.g., from 1 to some number). When preparing the codeword, the UE 205 determines channel compression matrix parameters, including amplitude and phase parameters, using the described approaches to derive the codeword.

As used herein, the channel matrix for W total subcarriers is defined by equation 1, below:

$$H = [H^T(1), \ldots, H^T(W)]^T \in \mathbb{C}^{2N_{rx}W \times 2N_{tx}} \quad \text{Equation 1}$$

Here, $H(w) \in \mathbb{C}^{2N_{rx}W \times 2N_{tx}}$ is the channel matrix for the w-th subcarrier. Note that $N_{tx}$ and $N_{rx}$ denote the number of transmit and receive antenna ports for each polarization, respectively.

In wideband ("WB") considering all the W subcarriers, the channel matrix is compressed such as represented with equation 2:

$$H^{BS} \triangleq H(I_2 \otimes B) \in \mathbb{C}^{2N_{rx}W \times 2L} \quad \text{Equation 2}$$

Here, B denotes the set of L discrete Fourier transform ("DFT") beams where $\mathbb{C} \in \mathbf{b}_\ell^{N_{tx}}, \ell \in \{1, \ldots, L\}$, and is defined as:

$$B = [b_1, \ldots, b_L] \in \mathbb{C}^{N_{tx} \times L} \quad \text{Equation 3}$$

As used herein, the compressed matrix $H^{BS}$ is referred to as the WB beamspace channel matrix. The subband ("SB") beamspace channel matrix is represented below with equation 4, where $s \in \{1, \ldots S\}$:

$$H^{BS}[s] = \quad \text{Equation 4}$$
$$\left[ H\left(1 + \frac{(s-1)W}{S}\right)^T, \ldots, H\left(\frac{sW}{S}\right)^T \right]^T (I_2 \otimes B) \in \mathbb{C}^{2N_{rx}W/S \times 2L}$$

In each SB, 2L-dimensional beamformers are quantized based on the SB beamspace matrix. Note that the 2L-dimensional beamformer is quantized for each transmission layer and each SB. Therefore, the total feedback overhead for SB CSI increases proportionally to the number of total SBs and the number of maximum transmission layers.

Considerable performance gain can be achieved by extending the current rank 1-2 Type II codebook to rank 1-4. However, this performance gain is obtained at the expense of exorbitant feedback overhead. To reduce the huge SB CSI reporting overhead, the present disclosure describes practical CSI codebook suitable for higher-rank transmission by considering limited feedback resources.

Figure 3:
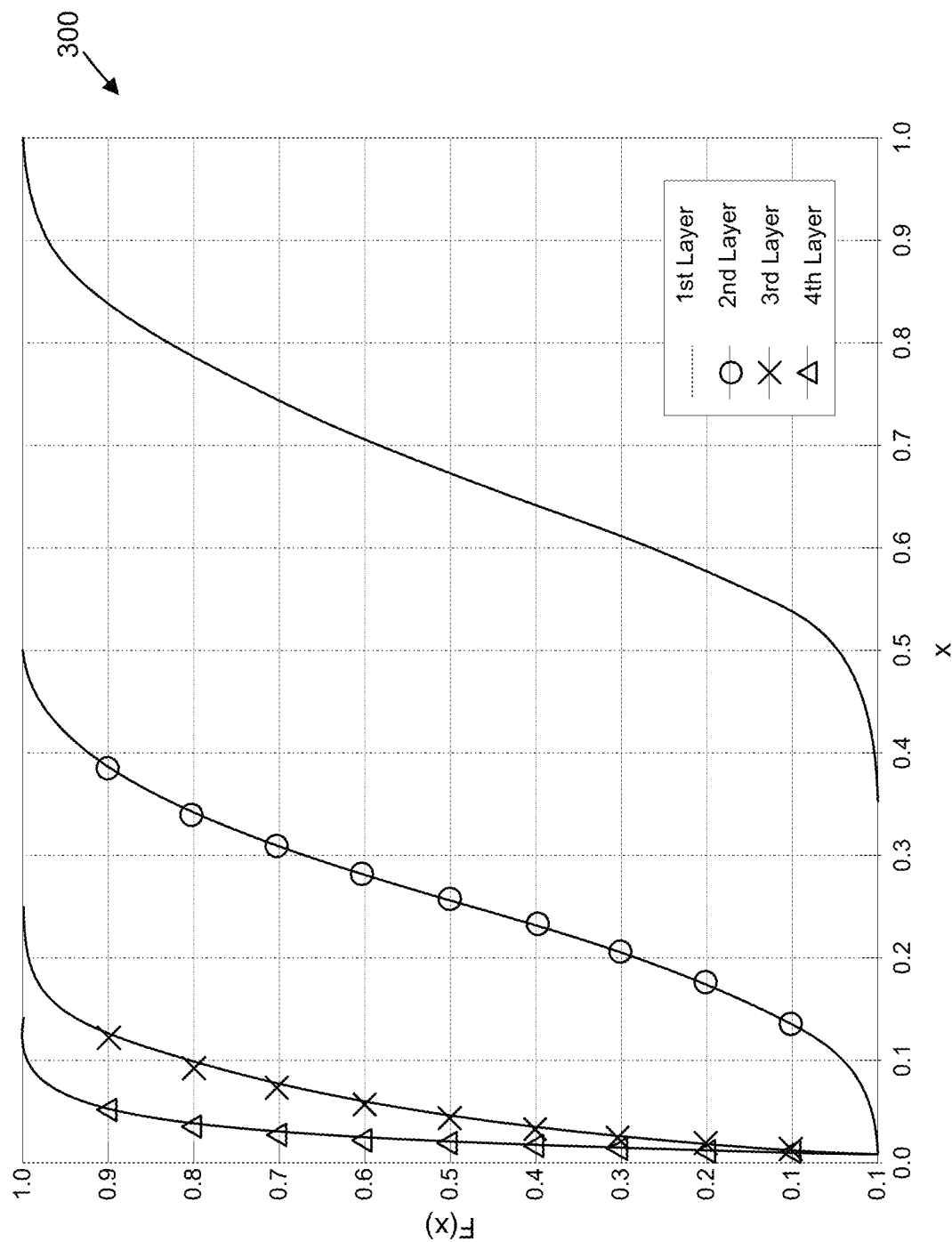
FIG. 3 is a diagram illustrating one embodiment of an empirical cumulative distribution function ("CDF") of L dominant singular values of beamspace matrix.

FIG. 3 is a diagram illustrating one embodiment of an empirical cumulative distribution function ("CDF") 300 of L dominant singular values of beamspace matrix. FIG. 3 shows distribution of channel gains contained in directions of right singular vectors of the WB beamspace channel matrix $H^{BS}$. Specifically, FIG. 3 verifies the distribution of channel gains by calculating the CDF of the L dominant singular values $\lambda_\ell(H^{BS})$. Note that a right singular vector denotes a channel direction of each transmission layer and a singular value denotes its corresponding channel gain.

The empirical CDF 300 confirms that most gains will be contained in the direction of the first and second transmission layers and small amounts of gains will be contained in the directions of the third and fourth transmission layers.

Figure 4A:
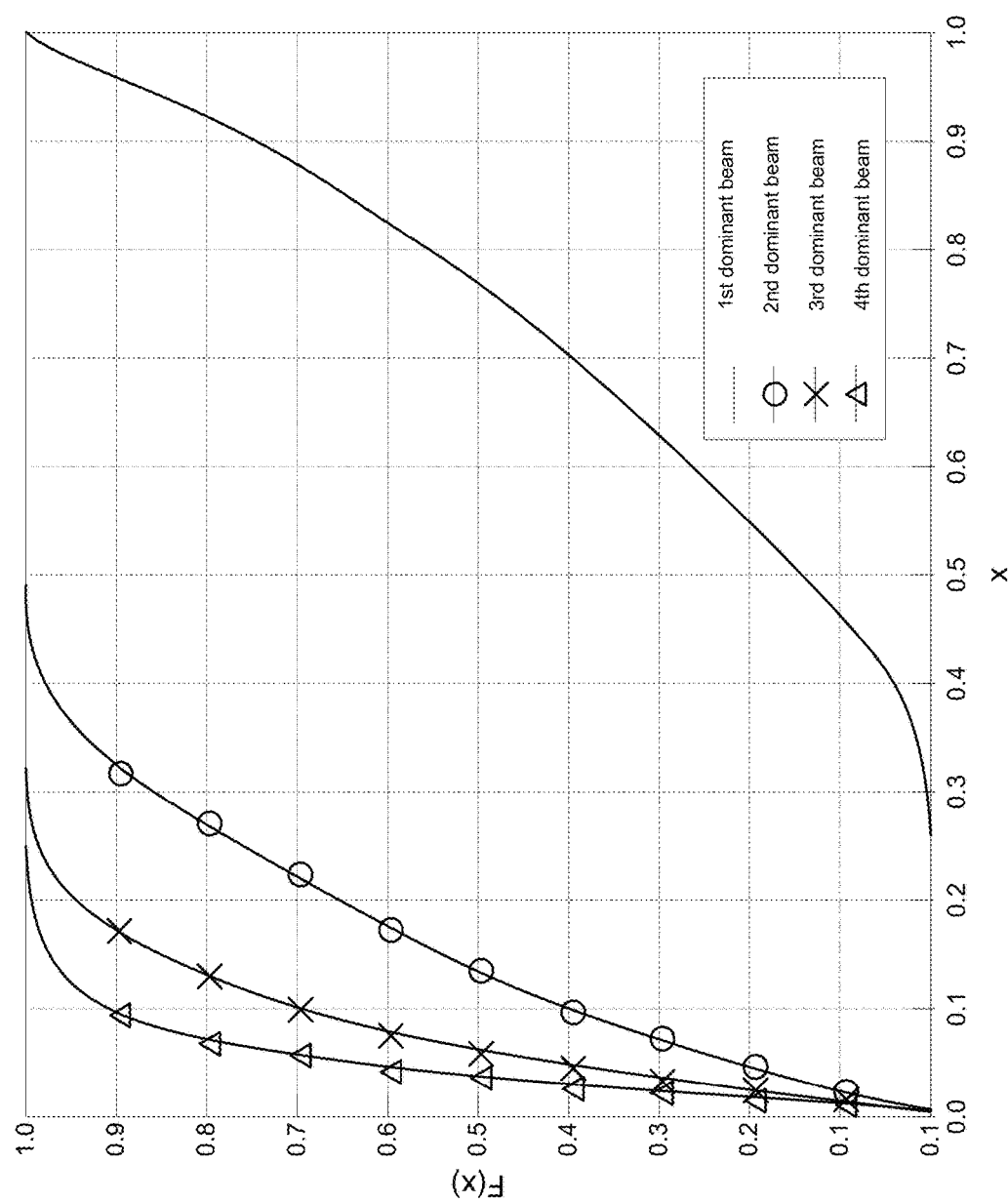
FIGS. 4A is a diagram illustrating one embodiment of an empirical CDF normalized power in beam direction of selected DFT beams for a first layer of a multi-layer transmission.
Figure 4B:
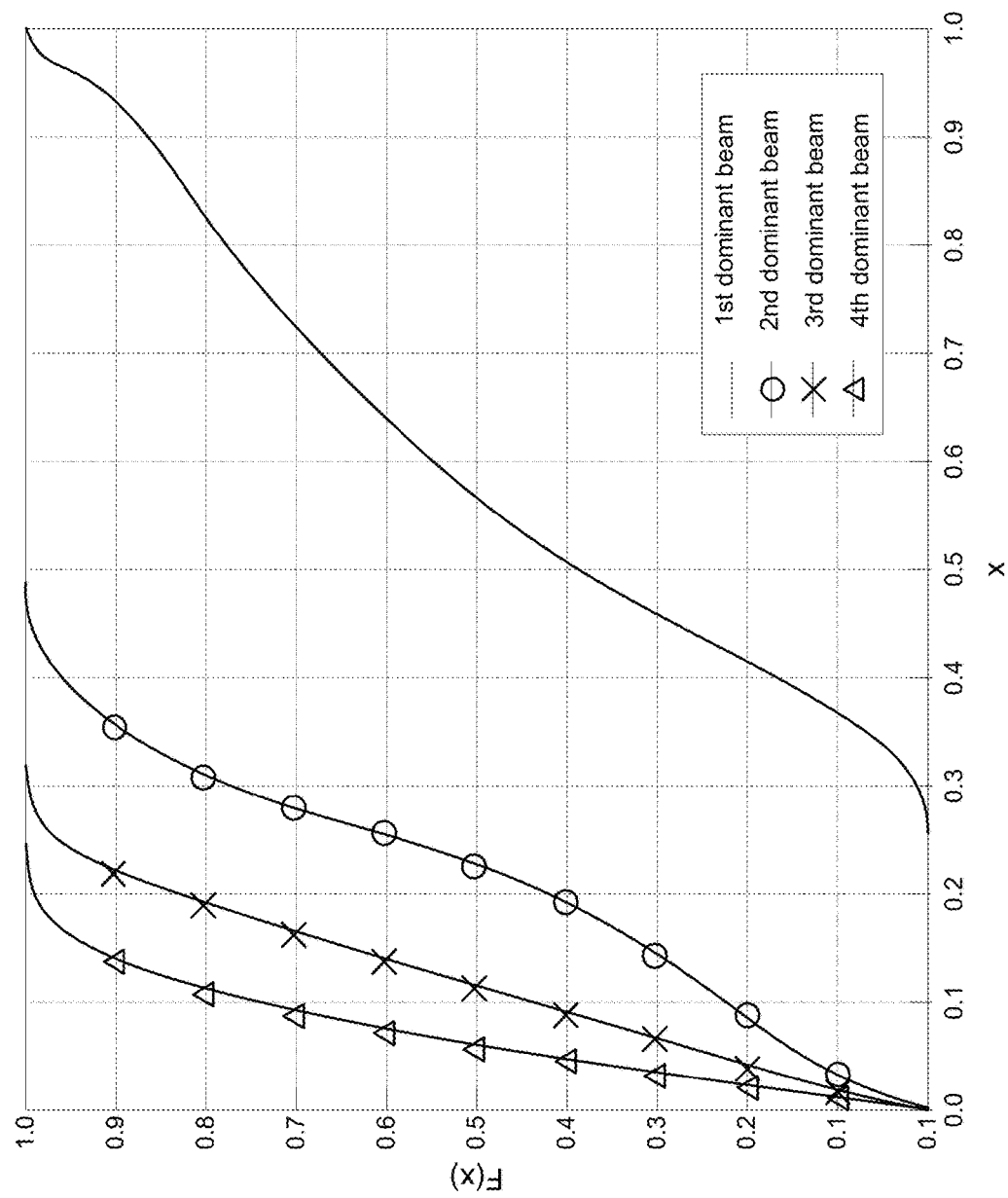
FIG. 4B is a diagram illustrating one embodiment of an empirical CDF normalized power in beam direction of selected DFT beams for a second layer of a multi-layer transmission.
Figure 4C:
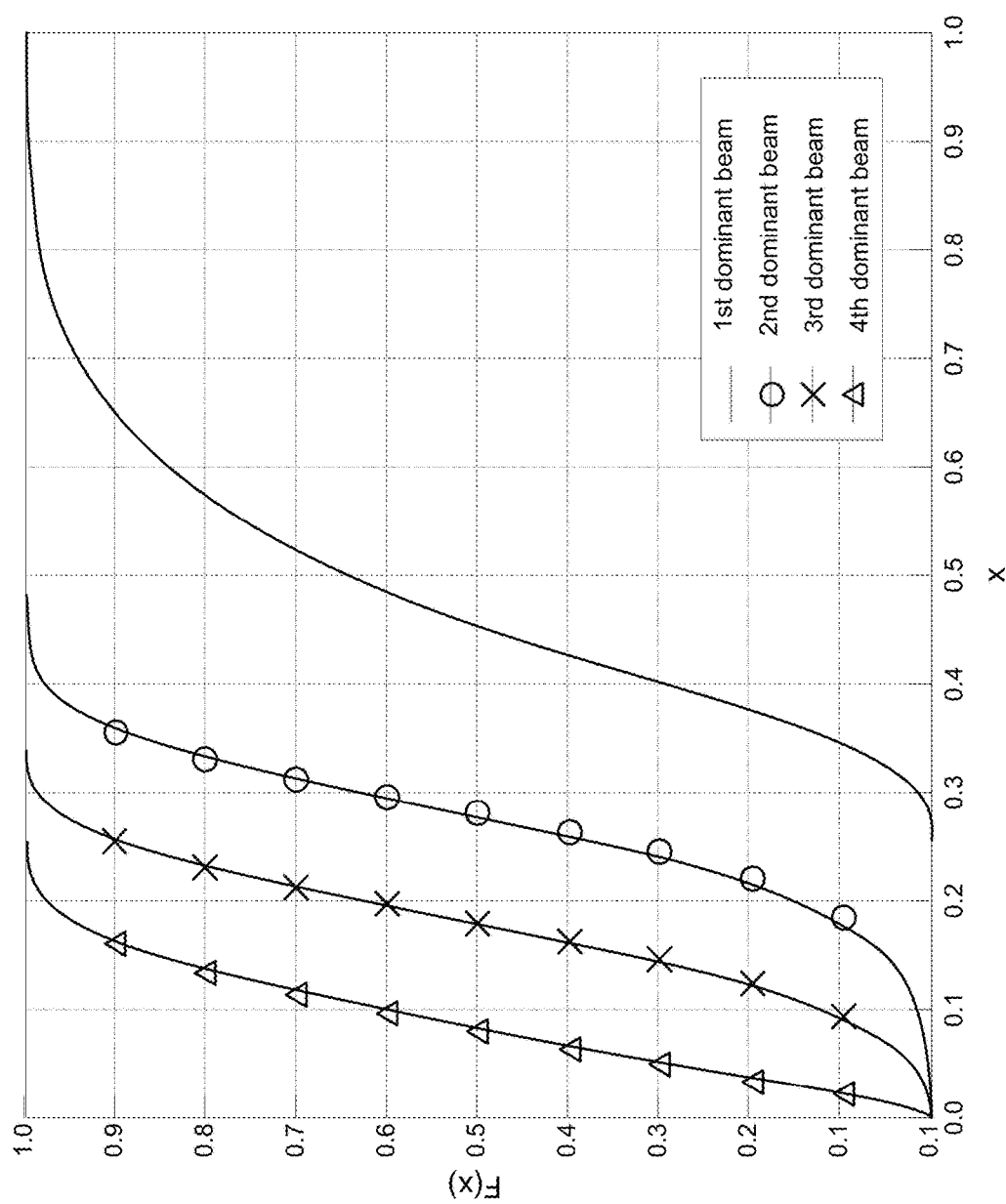
FIG. 4C is a diagram illustrating one embodiment of an empirical CDF normalized power in beam direction of selected DFT beams for a third layer of a multi-layer transmission.
Figure 4D:
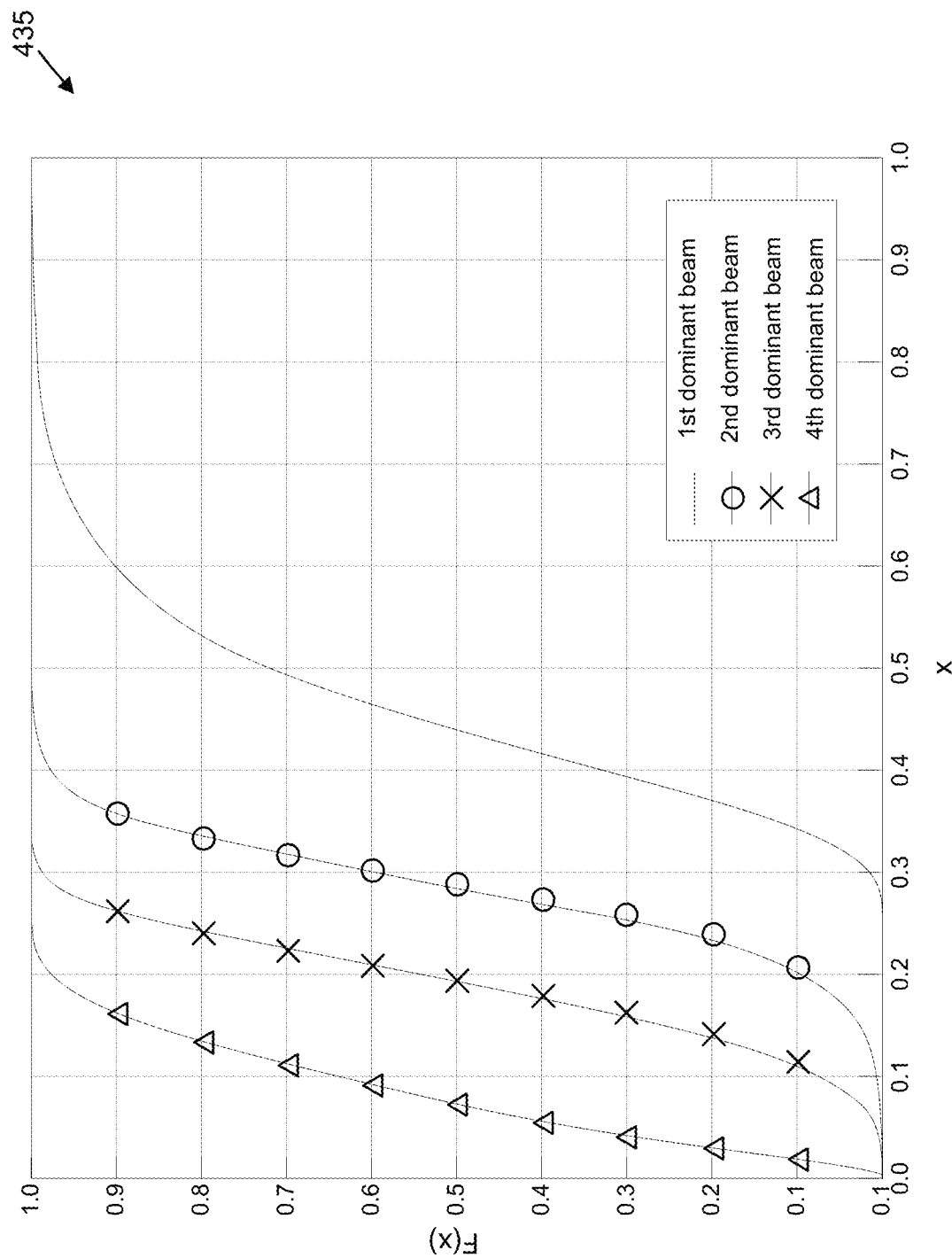
FIG. 4D is a diagram illustrating one embodiment of an empirical CDF normalized power in beam direction of selected DFT beams for a fourth layer of a multi-layer transmission.

FIGS. 4A-4D illustrate an empirical CDF normalized power in beam direction of selected DFT beams for each layer in a four-layer transmission. FIG. 4A shows the CDF 405 for the first layer, FIG. 4B shows the CDF 415 for the second layer, FIG. 4C shows the CDF 425 for the third layer, and FIG. 4D shows the CDF 435 for the fourth layer.

The empirical CDF normalized powers are described by equation for, below:

$$\tilde{\gamma}_\ell^2 = \frac{\|H(I_2 \otimes b_\ell)\|_F^2}{\sum_{l=1}^{L} \|H(I_2 \otimes b_l)\|_F^2} \quad \text{Equation 5}$$

As shown in FIGS. 4A-D, it is verified that more than 62% and 46% channel gains are contained in the first dominant beams as depicted in FIGS. 4A-B, corresponding to the first and second transmission layers (with probability of 0.7). However, it is also shown that this tendency becomes less pronounced in the third and fourth transmission layers, as shown in FIGS. 4C-D which correspond to the third and fourth transmission layers.

Referring again to FIG. 3, it is confirmed empirically that that most of the channel gains are contained in the directions of first and second transmission layers and only a small amount of channel gains are contained in the directions of third and fourth transmission layers. It is also verified in FIGS. 4A-D that most of channel gains are contained in the beam directions of the first and second dominant beams and only small amount of channel gains are contained in the beam directions of the third and fourth dominant beams. However, this tendency of having most of channel gains in the first and/or second dominant beams becomes less pronounced as the transmission layer becomes higher. Therefore, while reducing feedback overhead, choosing only one or two dominant beams may not maintain data-rate performances compared to the higher-rank Type II CSI codebook.

Moreover, the rank of the beamspace matrix for the r-th transmission layer is upper bounded such as rank $(H_r^{BS}) \leq 2L - r$ because the right singular vectors, which are quantized for the previous transmission layer $\{1, \ldots, r-1\}$, are projected out from the beamspace matrix. For example, although the dimension of the beamspace matrix for the 4th transmission layer $H_4^{BS}$ is $2N_{rx}W \times 8$, the rank of $H_4^{BS}$ is upper bounded by 4, assuming L=4. Considering the reduced rank of the beamspace matrix, efficient quantization methods may focus on a few dominant right singular vectors of the beamspace matrix.

Based on the above discussions, higher-rank CSI codebooks may be optimized by: a) exploiting more feedback overhead for first and second layers and less feedback overhead for third and fourth layers and b) focusing on a few dominant right singular vectors of beamspace matrix.

Moreover, the present disclosure develops channel compressing algorithms by considering the CSI feedback optimization criteria above. In some embodiments, the first criterion may be satisfied by computing high-resolution CSI only for the first and second transmission layers. To compute CSI for the third and fourth layers with less feedback overhead compared to that for the first and second transmission layers, we compress the WB beamspace matrix, as described below in equation 6:

$$H_r^{comp} = H_r^{BS} G_r \quad \text{Equation 6}$$
$$= H_r(I_2 \otimes B) G_r \in \mathbb{C}^{2N_{rx} W \times \tilde{L}}$$

where $H_r^{BS} \in \mathbb{C}^{2N_{rx} W \times 2L}$ denotes the WB beamspace matrix, $G_r \in \mathbb{C}^{2L \times \tilde{L}}$ denotes the channel compressing matrix for the r-th layer, and $\tilde{L} < 2L$ denotes the channel compressing level. To satisfy the second criterion, channel compression vectors in $G_r$ may be constructed by quantizing the $\tilde{L}$ dominant singular vectors of $H_r^{BS}$. Note that the compression matrix is computed independently in each layer because the matrix is layer-specific in the proposed algorithms.

Consider the structure of the beamspace matrix used to construct the channel compression matrix effectively. To simplify the analysis, the present disclosure only considers a channel vector for a single frequency tone. Without loss of generality, the channel vector between $2N_{rx}$ dual-polarized, transmit antenna ports and a mono-polarized, single receive antenna port is simplified using equation 7:

$$h \approx \sum_{\ell=1}^{L} (\mathbf{p}_\ell \otimes \mathbf{b}_\ell) \in \mathbb{C}^{2N_{tx}} \quad \text{Equation 7}$$

where the polarization column vector, $\mathbf{p}_\ell$, corresponding to the $\ell$-th beam $\mathbf{b}_\ell \in \mathbb{C}^{N_{tx}}$, is defined using equation 8 below:

$$p_\ell = [p_{h\ell}, p_{v\ell}]^T \quad \text{Equation 8}$$
$$= \sqrt{\alpha_\ell} \left[ e^{j\theta_{h\ell}}, \sqrt{\beta_\ell} e^{j\theta_{v\ell}} \right]^T \in \mathbb{C}^2$$

With the channel vector for a single frequency tone, the beamspace channel vector is rewritten using equation 9, below:

$$h^{BS} = (I_2 \otimes B)^H h = \sum_{\ell=1}^{L} p_\ell \otimes (B^H b_\ell) \quad \text{Equation 9}$$
$$= \sum_{\ell=1}^{L} p_\ell \otimes [b_\ell^H b_1, b_\ell^H b_2, b_\ell^H b_3, b_\ell^H b_4]^H$$
$$= \sum_{\ell=1}^{L} p_\ell \otimes (I_L)_\ell$$
$$= \begin{bmatrix} 1 \\ 0 \end{bmatrix} \otimes \begin{bmatrix} p_{h1} \\ p_{h2} \\ p_{h3} \\ p_{h4} \end{bmatrix} + \begin{bmatrix} 0 \\ 1 \end{bmatrix} \otimes \begin{bmatrix} p_{v1} \\ p_{v2} \\ p_{v3} \\ p_{v4} \end{bmatrix}$$
$$= [p_{h1}, p_{h2}, p_{h3}, p_{h4}, p_{v1}, p_{v2}, p_{v3}, p_{v4}]^T \in \mathbb{C}^{2L}$$

where $(A)_\ell$ is the $\ell$-th column vector of the matrix A.

In this disclosure, there is focus on quantizing the beamspace channel vector to construct the channel compressing vector in $G_r$. Based on the different channel assumptions of the polarization vector $\mathbf{p}_\ell \in \mathbb{C}^2$, three channel compressing methods are described below, with reference to FIGS. 6-8.

Figure 5:
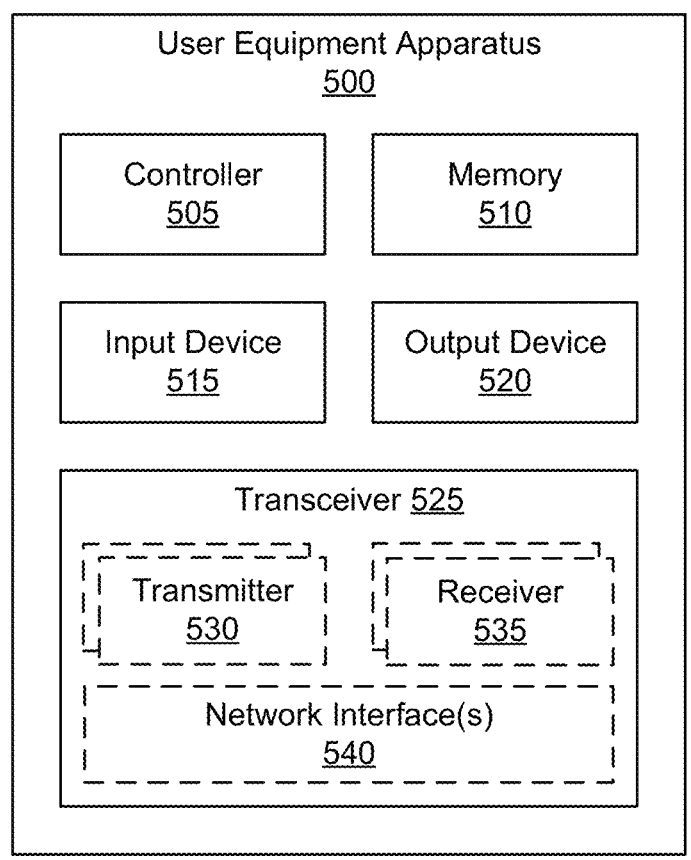
FIG. 5 is a schematic block diagram illustrating one embodiment of a user equipment apparatus for efficiently providing high-resolution CSI feedback.

FIG. 5 depicts one embodiment of a user equipment apparatus 500 that may be used for efficiently coding a CSI codebook and preparing a codeword therefrom, according to embodiments of the disclosure. The user equipment apparatus 500 may be one embodiment of the remote unit 105 and/or UE 205. Furthermore, the user equipment apparatus 500 may include a processor 505, a memory 510, an input device 515, a display 520, and a transceiver 525. In some embodiments, the input device 515 and the display 520 are combined into a single device, such as a touch screen. In certain embodiments, the user equipment apparatus 500 may not include any input device 515 and/or display 520.

As depicted, the transceiver 525 includes at least one transmitter 530 and at least one receiver 535. Additionally, the transceiver 525 may support at least one network interface 540. Here, the at least one network interface 540 facilitates communication with an eNB or gNB (e.g., using the Uu interface). Additionally, the at least one network interface 540 may include an interface used for communications with a network function in the mobile core network 130, such as an N1 interface used to communicate with the AMF 135. The transceiver 525 is configured to communicate with a transmit-receive point ("TRP"), such as the base unit 110 and/or the gNB 210, in a radio access network using spatial multiplexing, wherein multiple transmission layers are transmitted at a time, each transmission layer comprising multiple beams.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the display 520, and the transceiver 525.

In some embodiments, the transceiver 525 receives a set of reference signals transmitted from a TRP. From the received set of reference signals, the processor 505 selects a subset of beams from a plurality of orthogonal beams and computes one or more sets of amplitude and phase parameters for one or more channel compression matrices. Here, each channel compression matrix corresponds to one transmission layer of a multiple-layer transmission. Moreover, each channel compression matrix is comprised of one or more column vectors. Having computed the amplitude and phase parameters, the processor 505 controls the transceiver 525 to send the amplitude and phase parameters to a network node, such as the base unit 110 or gNB 210.

In some embodiments, the amplitude and phase parameters for each compression matrix are comprised of sets of amplitude and phase parameters, each set of amplitude and phase parameters parameterize in one column of a channel compression matrix. In certain embodiments, the number of column vectors which comprise each channel compression matrix is less than the number of beams in the selected subset of beams.

In various embodiments, the sets of amplitude and phase parameters include: polarization-specific amplitude coefficient parameters, polarization-specific phase coefficient parameters, and polarization amplitude offset coefficient parameters. In such embodiments, the polarization-specific amplitude coefficient parameters may be in the form of one or more polarization-specific amplitude vectors, the polarization-specific phase coefficient parameters may be in the form of one or more polarization-specific phase vectors, and the polarization amplitude offset coefficient parameters may be in the form of a polarization amplitude offset vector. Such sets of amplitude and phase parameters may result from the channel compressing techniques discussed below with reference to FIG. 6.

In various embodiments, the sets of amplitude and phase parameters include: polarization-common amplitude coefficient parameters, polarization-specific phase coefficient parameters, and polarization amplitude offset coefficient parameters. In such embodiments, the polarization-common amplitude coefficient parameters may be in the form of a polarization-common amplitude vector, the polarization-specific phase coefficient parameters may be in the form of one or more polarization-specific phase vectors, and the polarization amplitude offset coefficient parameters may be in the form of a polarization amplitude offset vector. Such sets of amplitude and phase parameters may result from the channel compressing techniques discussed below with reference to FIG. 7.

In various embodiments, the sets of amplitude and phase parameters include: polarization-common amplitude coefficient indicators, polarization-common phase coefficient indicators, polarization amplitude offset coefficient indicators, and polarization phase offset coefficient indicators. In such embodiments, the polarization-common amplitude coefficient indicators may be in the form of a polarization-common amplitude vector, the polarization-common phase coefficient indicators may be in the form of a polarization-common phase vector, the polarization amplitude offset coefficient indicators may be in the form of a polarization applicant vector, and the polarization phase offset coefficient indicators may be in the form of a polarization phase vector. Such sets of amplitude and phase parameters may result from the channel compressing techniques discussed below with reference to FIG. 8.

In some embodiments, the largest polarization-specific amplitude coefficient of the polarization-specific amplitude coefficients for each polarization is chosen as the reference entry for that polarization and all other polarization-specific amplitude coefficients for that polarization in the subset are quantized into half-power decrease in steps relative to the reference entry. In some embodiments, the largest polarization amplitude offset coefficient of the polarization amplitude offset coefficients is chosen as the reference entry and all other polarization amplitude offset coefficients are quantized into three-quarter power decreasing steps relative to the reference entry.

The processor 505 may generate indicators of the calculates sets of amplitude and phase parameters and send the indicators to the network. In one embodiment, the processor 505 controls the transceiver 525 to send the indicators corresponding to the amplitude and phase parameters to the same network node that sends the reference signals. In other embodiments, the processor 505 controls the transceiver 525 to send the indicators corresponding to the amplitude and phase parameters to a different network node than the transmitter of the reference signals.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media. In some embodiments, the memory 510 stores data relating to higher-rank CSI codebooks, for example beam indices, beam amplitudes, codebooks, precoding matrices, amplitude parameters, phase parameters, and the like. In certain embodiments, the memory 510 also stores program code and related data, such as an operating system or other controller algorithms operating on the user equipment apparatus 500 and one or more software applications.

The input device 515, in one embodiment, may include any known computer input device including a touch panel, a button, a keyboard, a stylus, a microphone, or the like. In some embodiments, the input device 515 may be integrated with the display 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The display 520, in one embodiment, may include any known electronically controllable display or display device. The display 520 may be designed to output visual, audible, and/or haptic signals. In some embodiments, the display 520 includes an electronic display capable of outputting visual data to a user. For example, the display 520 may include, but is not limited to, an LCD display, an LED display, an OLED display, a projector, or similar display device capable of outputting images, text, or the like to a user. As another, non-limiting, example, the display 520 may include a wearable display such as a smart watch, smart glasses, a heads-up display, or the like. Further, the display 520 may be a component of a smart phone, a personal digital assistant, a television, a table computer, a notebook (laptop) computer, a personal computer, a vehicle dashboard, or the like.

In certain embodiments, the display 520 includes one or more speakers for producing sound. For example, the display 520 may produce an audible alert or notification (e.g., a beep or chime). In some embodiments, the display 520 includes one or more haptic devices for producing vibrations, motion, or other haptic feedback. In some embodiments, all or portions of the display 520 may be integrated with the input device 515. For example, the input device 515 and display 520 may form a touchscreen or similar touch-sensitive display. In other embodiments, the display 520 may be located near the input device 515.

The transceiver 525 communicates with one or more network functions of a mobile communication network. The transceiver 525 operates under the control of the processor 505 to transmit messages, data, and other signals and also to receive messages, data, and other signals. For example, the processor 505 may selectively activate the transceiver (or portions thereof) at particular times in order to send and receive messages. The transceiver 525 may include one or more transmitters 530 and one or more receivers 535. To support spatial multiplexing and/or beamforming, the transceiver 525 may include multiple transmitters 530 and/or multiple receivers 535.

Figure 6:
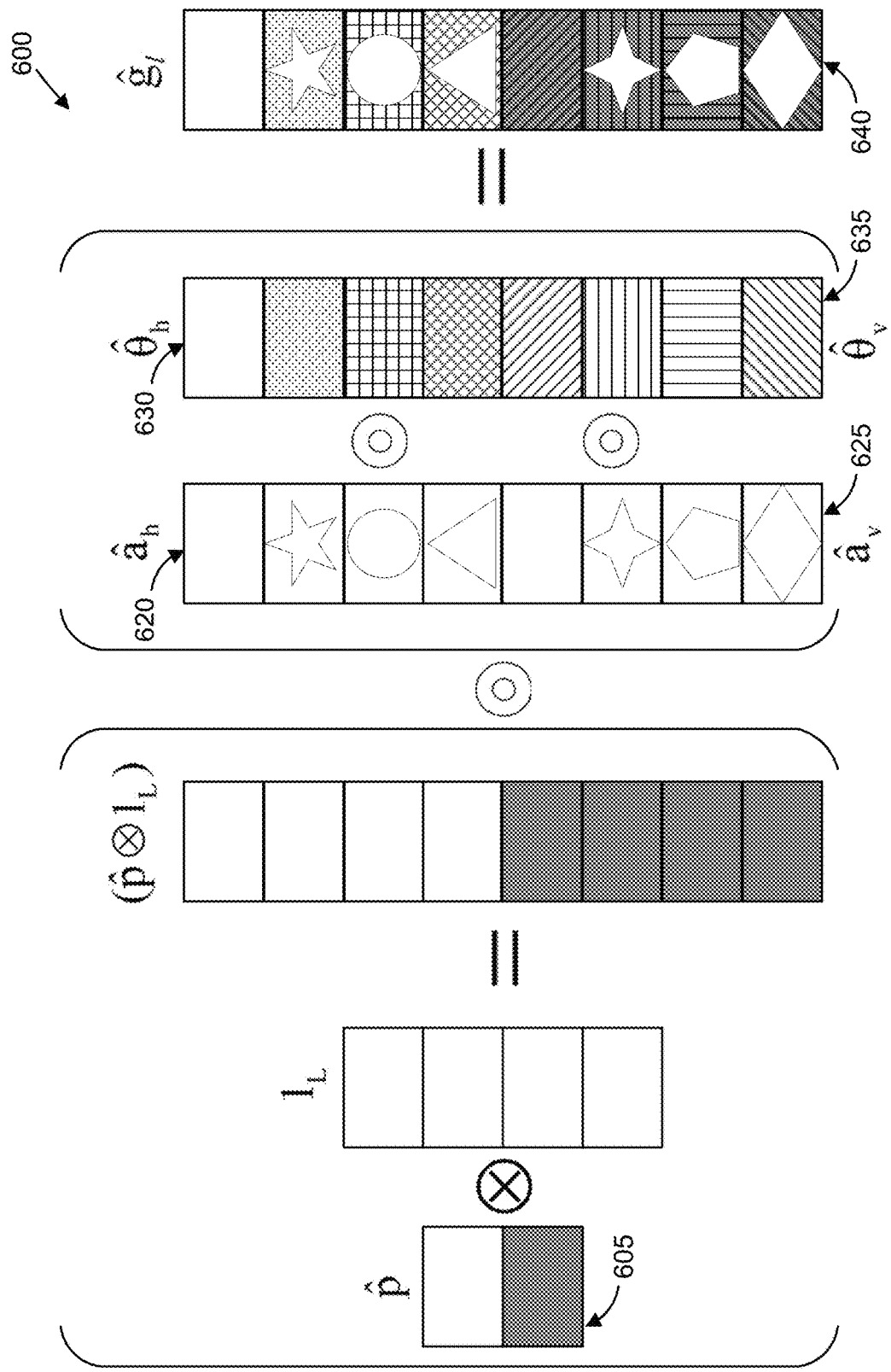
FIG. 6 is a diagram illustrating a graphical overview of a quantization approach of a first channel compressing procedure.

FIG. 6 depicts a graphical overview 600 of a quantization approach of a first channel compressing procedure. The first channel compression procedure is developed assuming that the polarization column vector for the $\ell$-th dominant beam is defined using equation 8, above:

In the first channel compression procedure, $\alpha_\ell$ represents the power of the horizontally-polarized component of the $\ell$-th dominant beam and $\beta_\ell$ represents the power ratio of the $\ell$-th dominant beam between the different polarizations (e.g., horizontal, vertical). The beamspace column vector of equation 9 is then rewritten using equation 10 below:

Equation 10

$$h^{BS} = \begin{bmatrix} 1 \\ 0 \end{bmatrix} \otimes \left( \begin{bmatrix} \sqrt{\alpha_1} \\ \sqrt{\alpha_2} \\ \sqrt{\alpha_3} \\ \sqrt{\alpha_4} \end{bmatrix} \odot \begin{bmatrix} e^{j\theta_{h1}} \\ e^{j\theta_{h2}} \\ e^{j\theta_{h3}} \\ e^{j\theta_{h4}} \end{bmatrix} \right) + \begin{bmatrix} 0 \\ 1 \end{bmatrix} \otimes \left( \begin{bmatrix} \sqrt{\alpha_1 \beta_1} \\ \sqrt{\alpha_2 \beta_2} \\ \sqrt{\alpha_3 \beta_3} \\ \sqrt{\alpha_4 \beta_4} \end{bmatrix} \odot \begin{bmatrix} e^{j\theta_{v1}} \\ e^{j\theta_{v2}} \\ e^{j\theta_{v3}} \\ e^{j\theta_{v4}} \end{bmatrix} \right)$$

$$= \begin{bmatrix} 1 \\ 0 \end{bmatrix} \otimes \left( \begin{bmatrix} \sqrt{\alpha_1} \\ \sqrt{\alpha_2} \\ \sqrt{\alpha_3} \\ \sqrt{\alpha_4} \end{bmatrix} \odot \begin{bmatrix} e^{j\theta_{h1}} \\ e^{j\theta_{h2}} \\ e^{j\theta_{h3}} \\ e^{j\theta_{h4}} \end{bmatrix} \right) + \begin{bmatrix} 0 \\ \sqrt{\beta} \end{bmatrix} \otimes \left( \begin{bmatrix} \sqrt{\alpha_1 \tilde{\beta}_1} \\ \sqrt{\alpha_2 \tilde{\beta}_2} \\ \sqrt{\alpha_3 \tilde{\beta}_3} \\ \sqrt{\alpha_4 \tilde{\beta}_4} \end{bmatrix} \odot \begin{bmatrix} e^{j\theta_{v1}} \\ e^{j\theta_{v2}} \\ e^{j\theta_{v3}} \\ e^{j\theta_{v4}} \end{bmatrix} \right)$$

$$= \begin{bmatrix} 1 \\ 0 \end{bmatrix} \otimes (a_h \odot e^{j\theta_h}) + \begin{bmatrix} 0 \\ \sqrt{\beta} \end{bmatrix} \otimes (a_v \odot e^{j\theta_v})$$

$$= (p \otimes 1_L) \odot \begin{bmatrix} a_h \odot e^{j\theta_h} \\ a_v \odot e^{j\theta_v} \end{bmatrix} \in \mathbb{C}^{2L}$$

Here p denotes the polarization amplitude offset vector, $a_\alpha$ denotes the polarization-specific amplitude vector in the domain $\alpha \in \{h, v\}$ (corresponding to the vertical and horizontal polarizations), and $\theta_\alpha$ denotes the polarization-specific phase vector in the domain $\alpha \in \{h, v\}$.

Based on the structure of the beamspace column vector, the channel compressing vectors may be quantized using equation 11, where $\ell = \{1, \ldots \tilde{L}\}$, such that:

$$\hat{g}_\ell = \frac{(\hat{p} \otimes 1_L) \odot \begin{bmatrix} \hat{a}_h \odot e^{j\hat{\theta}_h} \\ \hat{a}_v \odot e^{j\hat{\theta}_v} \end{bmatrix}}{\left\| (\hat{p} \otimes 1_L) \odot \begin{bmatrix} \hat{a}_h \odot e^{j\hat{\theta}_h} \\ \hat{a}_v \odot e^{j\hat{\theta}_v} \end{bmatrix} \right\|_2}$$

Equation 11

Here $\hat{p} \in \mathbb{C}^2$ denotes the (unit-norm) quantized polarization amplitude offset vector, $\hat{a}_\alpha \in \mathbb{C}^L$ denotes the (unit-norm) quantized polarization-specific amplitude vector in the domain $\alpha \in \{h, v\}$ (corresponding to the vertical and horizontal polarizations), and $\hat{\theta}_\alpha \in [0, 2\pi)^L$ denotes the quantized polarization-specific phase vector in the domain $\alpha \in \{h, v\}$. Note that the structure of the channel compression vector is depicted in FIG. 6. Note that shapes within the boxes denote the amplitude of elements and shading patterns in the boxes denote the phase of elements.

Moreover, the first channel compressing procedure may include the following steps:

Step I: Initialize the beamspace matrix, e.g., $$H_1^{BS} = H^{BS} \in \mathbb{C}^{2N_{rx}W \times 2L}$$

Step II: Compute the channel compressing vectors iteratively for $\ell = 1 : \tilde{L}$. Note that $\tilde{L}$ represents the number of columns in the channel compression matrix.

Step II-1: Compute the right dominant singular vector consisting of polarization-specific sub-vectors $v^{opt}$, defined as:

$$v^{opt} = \mathfrak{v}_1(H_\ell^{BS}) = [(v_h^{opt})^T, (v_v^{opt})^T]^T \in \mathbb{C}^{2L} \quad \text{Equation 12}$$

Here, the amplitude parameters are polarization-specific. Note that in each polarization, e.g., $v_\alpha^{opt}$, $\alpha \in \{h, v\}$, an entry having the strongest amplitude is selected among L entries to be the reference entity. The selected reference entity for each polarization will be used for the amplitude quantization and they are assumed to be one. Moreover, an entry having the stronger amplitude is chosen among the two selected entries. In the phase quantization process, the phase of the reference entry is assumed to be zero. In the polarization amplitude quantization, the amplitude of the reference entry is assumed to be one. To simplify presentation and analysis, it is assumed that the first entry is selected as the reference entry in $v^{opt}$.

Step II-2: Quantize the polarization-specific sub-singular vectors iteratively for $\alpha \in \{h, v\}$. Here, the polarization-specific sub-singular vectors include polarization-specific phase sub-vectors for each polarization and polarization-specific amplitude sub-vectors for each polarization.

Step II-2-A: Quantize the polarization-specific phases of the sub-singular vectors $\hat{\theta}_h$ 630 and $\hat{\theta}_v$ 635 using Equation 13:

$$\hat{\theta}_a = \underset{\tilde{\theta} \in C_{phase}^L}{\mathrm{argmin}} \left\| \tilde{\theta} - \angle v_a^{opt} \right\|_2^2 \in [0, 2\pi)^L \quad \text{Equation 13}$$

As depicted, the sub-vector $\hat{\theta}_h$ 630 and the sub-vector $\hat{\theta}_v$ 635 may be concatenated into one vector. Here, the global phase codebook is defined as $C_{phase}^L = (\mathcal{Z}_B^{phase})^L$, where the phase codebook includes $2^B$ phase entries, such that $\mathcal{Z}_B^{phase} = \{0, \ldots 2\pi(2^B-1)/2^B\}$.

Step II-2-B: Quantize the polarization-specific amplitudes of the sub-singular vectors $\hat{a}_h$ 620 and $\hat{a}_v$ 625 using equation 14:

$$\hat{a}_a = \underset{\tilde{a} \in C_{amp}^L}{\mathrm{argmax}} \left| (v_a^{opt})^H \left( \frac{\tilde{a}}{\|\tilde{a}\|_2} \odot e^{j\hat{\theta}_a} \right) \right|^2 \in \mathbb{C}^L \quad \text{Equation 14}$$

As depicted, the sub-vector $\hat{a}_h$ 620 and the sub-vector $\hat{a}_v$ 625 may be concatenated into one vector. Here, the global amplitude codebook is defined as $C_{amp}^L = (\mathcal{Z}_B^{amp})^L$, where the amplitude codebook includes $2^B$ amplitude entries defined in half-power decreasing steps (relative to the reference entry) by $\mathcal{Z}_B^{amp} = \{(1/\sqrt{2})^0, (1/\sqrt{2})^1, \ldots, (1/\sqrt{2})^{2^B-1}\}$.

Step II-3: Quantize the polarization amplitude offset vector 605 using equation 15:

$$\hat{p} = \underset{\tilde{p} \in C_{pol,amp}^2}{\mathrm{argmax}} \left| (v^{opt})^H \left( \left( \frac{\tilde{p}}{\|\tilde{p}\|_2} \otimes 1_L \right) \odot \begin{bmatrix} \hat{a}_h \odot e^{j\hat{\theta}_h} \\ \hat{a}_v \odot e^{j\hat{\theta}_v} \end{bmatrix} \right) \right|^2 \in \mathbb{C}^2 \quad \text{Equation 15}$$

In certain embodiments, the global amplitude codebook for polarization vector is defined as $C_{pol,amp}^L = (\mathcal{Z}_B^{pol,amp})^L$. In one embodiment, the amplitude codebook for polarization vector is defined in three-quarter-power decreasing steps (relative to the reference entry) by $\mathcal{Z}_B^{pol,amp} = \{(\sqrt{3/4})^0, (\sqrt{3/4})^1, \ldots, (\sqrt{3/4})^{2^B-1}\}$ II-4: Compute the $\ell$-th channel compressing vector, $\hat{g}_\ell$ 640, using Equation 11.

II-5: Update the beamspace matrix for computing the $(\ell+1)$-th channel compressing vector using Equation 16:

$$H_{\ell+1}^{BS} = H_\ell^{BS} (I_{2L} - \hat{g}_\ell \hat{g}_\ell^H) \in \mathbb{C}^{2N_{tx}W \times 2L} \quad \text{Equation 16}$$

Step III: Complete the channel compressing matrix $G = [\hat{g}_1, \ldots, \hat{g}_{\tilde{L}}] \in \mathbb{C}^{2L \times \tilde{L}}$. And the first channel compression procedure ends.

Figure 7:
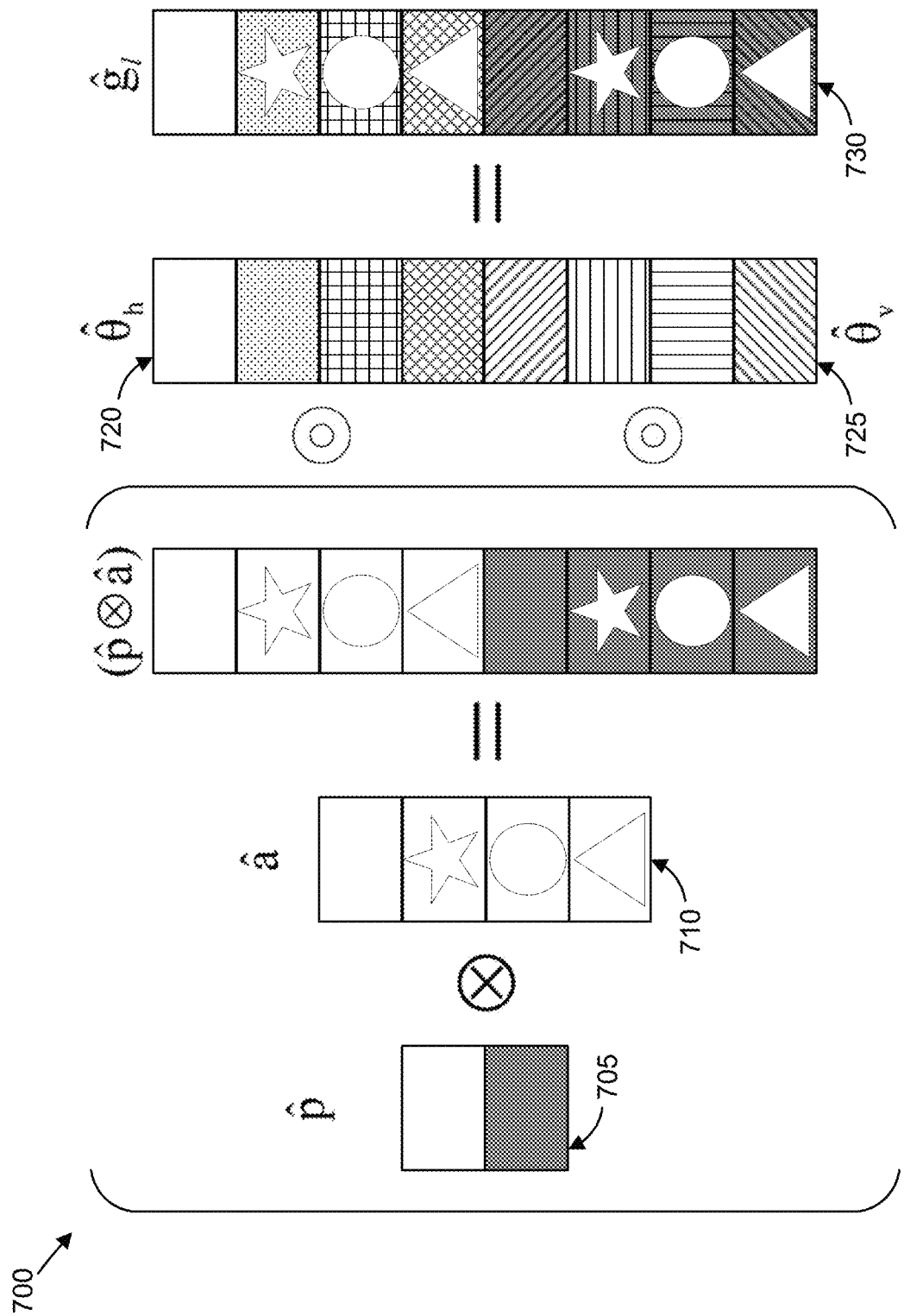
FIG. 7 is a diagram illustrating one embodiment of a graphical overview of a quantization approach of a second channel compressing procedure.

FIG. 7 depicts a graphical overview 700 of a quantization approach of a second channel compressing procedure. The second channel compression procedure is developed assuming that $\beta_\ell = \beta$, for all $\ell = \{1, \ldots, L\}$. As $\beta_\ell$ represents the amplitude difference between the different polarizations, here it is assumed that the amplitude difference is common to all beams.

Accordingly, the polarization column vector for the $\ell$-th dominant beam is then defined using equation 8, above. Moreover, the beamspace column vector of equation 9 may be rewritten using equation 17 below:

$$h^{BS} = \begin{pmatrix} \begin{bmatrix} 1 \\ 0 \end{bmatrix} \otimes \left( \begin{bmatrix} \sqrt{\alpha_1} \\ \sqrt{\alpha_2} \\ \sqrt{\alpha_3} \\ \sqrt{\alpha_4} \end{bmatrix} \odot \begin{bmatrix} e^{j\theta_{h1}} \\ e^{j\theta_{h2}} \\ e^{j\theta_{h3}} \\ e^{j\theta_{h4}} \end{bmatrix} \right) \\ + \begin{bmatrix} 0 \\ \sqrt{\beta} \end{bmatrix} \otimes \left( \begin{bmatrix} \sqrt{\alpha_1} \\ \sqrt{\alpha_2} \\ \sqrt{\alpha_3} \\ \sqrt{\alpha_4} \end{bmatrix} \odot \begin{bmatrix} e^{j\theta_{v1}} \\ e^{j\theta_{v2}} \\ e^{j\theta_{v3}} \\ e^{j\theta_{v4}} \end{bmatrix} \right) \end{pmatrix}$$

$$= \begin{bmatrix} 1 \\ 0 \end{bmatrix} \otimes (a \odot e^{j\theta_h}) + \begin{bmatrix} 0 \\ \sqrt{\beta} \end{bmatrix} \otimes (a \odot e^{j\theta_v})$$

$$= (p \otimes a) \odot \begin{bmatrix} e^{j\theta_h} \\ e^{j\theta_v} \end{bmatrix} \in \mathbb{C}^{2L}$$

Equation 17

Here p denotes the polarization amplitude offset vector, a denotes the polarization-common amplitude vector, and $\theta_\alpha$ denotes the polarization-specific phase vector in the domain $\alpha \in \{h, v\}$ (corresponding to the vertical and horizontal polarizations).

Based on the structure of the beamspace column vector, the channel compressing vectors may be quantized for each dominant beam, $\ell = \{1, \ldots, \hat{L}\}$, such that $$\hat{g}_\ell = \frac{(\hat{p} \otimes \hat{a}) \odot \begin{bmatrix} e^{j\hat{\theta}_h} \\ e^{j\hat{\theta}_v} \end{bmatrix}}{\left\| (\hat{p} \otimes \hat{a}) \odot \begin{bmatrix} e^{j\hat{\theta}_h} \\ e^{j\hat{\theta}_v} \end{bmatrix} \right\|_2}$$

Equation 18 where $\hat{p} \in \mathbb{C}^2$ denotes the (unit-norm) quantized polarization amplitude offset vector, $\hat{a} \in \mathbb{C}^L$ denotes the (unit-norm) quantized polarization-common amplitude offset vector, and $\hat{\theta}_\alpha \in [0, 2\pi)^L$ denotes the quantized phase-specific vector in the domain $\alpha \in \{h, v\}$. The structure of the channel compressing vector is depicted in FIG. 7. Note that shapes within the boxes denote the amplitude of elements and shading patterns in the boxes denote the phase of elements.

Moreover, the second channel compressing procedure may include the following steps:

Step I: Initialize the beamspace matrix, e.g., $$H_1^{BS} = H^{BS} \in \mathbb{C}^{2N_{TX}W \times 2L}$$

Step II: Compute the channel compressing vectors iteratively for $\ell = 1:\hat{L}$ Step II-1: Compute the right dominant singular vector consisting of polarization-specific sub-vectors using Equation 12, above. Again, an entry having the strongest amplitude among 2L entries in $v^{opt}$ is selected to be the reference entry for that polarization. The amplitude of the reference entry is assumed to be one and the phase of the reference entry is assumed to be zero. To simplify presentation and analysis, it is assumed that the first entry is selected as the reference entry in $v^{opt}$.

Step II-2: Quantize the polarization-specific sub-singular vectors $\alpha \in \{h, v\}$.

Step II-2-A: Quantize the polarization-specific phases of the sub-singular vectors $\hat{\theta}_h$ 720 and $\hat{\theta}_v$ 725 using Equation 13, above. As depicted, the sub-vector $\hat{\theta}_h$ 720 and the sub-vector $\hat{\theta}_v$ 725 may be concatenated into one vector. Again, the global phase codebook is defined as $C_{phase}^L = (Z_B^{phase})^L$, where the phase codebook including $2^B$ phase entries, such that $Z_B^{phase} = \{0, \ldots, 2\pi(2^B-1)/2^B\}$.

Step II-2-B: Quantize the polarization-common amplitudes of the sub-singular vector 710 using Equation 19, below:

$$\hat{a}_a = \underset{\tilde{a} \in C_{amp}^L}{\operatorname{argmax}} \left| (v_h^{opt})^H \left( \frac{\tilde{a}}{\|\tilde{a}\|_2} \odot e^{j\hat{\theta}_a} \right) \right|^2 + \left| (v_v^{opt})^H \left( \frac{\tilde{a}}{\|\tilde{a}\|_2} \odot e^{j\hat{\theta}_a} \right) \right|^2 \in \mathbb{C}^L$$

Equation 19

Note that the term "polarization-common" is used in reference to the assumption that β is common to all dominant beams. In certain embodiments, the global amplitude codebook is defined as $C_{amp}^L = (Z_B^{amp})^L$. In one embodiment, the amplitude codebook including $2^B$ amplitude entries is defined in half-power decreasing steps (relative to the reference entry) by $Z_B^{amp} = \{(1/\sqrt{2})^0, (1/\sqrt{2})^1, \ldots, (1/\sqrt{2})^{2^B-1}\}$.

Step II-3: Quantize the polarization amplitude offset vector 705 using Equation 20:

$$\hat{p} = \underset{\tilde{p} \in C_{pol,amp}^2}{\operatorname{argmax}} \left| (v^{opt})^H \left( \left( \frac{\tilde{p}}{\|\tilde{p}\|_2} \odot \hat{a} \right) \odot \begin{bmatrix} e^{j\hat{\theta}_h} \\ e^{j\hat{\theta}_v} \end{bmatrix} \right) \right|^2 \in \mathbb{C}^2$$

Equation 20

In certain embodiments, the global amplitude codebook for polarization vector is defined as $C_{pol,amp}^L = (Z_B^{pol,amp})^L$. In one embodiment, the amplitude codebook for polarization vector is defined in three-quarters-power decreasing steps (relative to the reference entry) by $Z_B^{pol,amp} = \{(\sqrt{3/4})^0, (\sqrt{3/4})^1, \ldots, (\sqrt{3/4})^{2^B-1}\}$.

Step II-4: Compute the $\ell$-th channel compressing vector 730 using equation 21:

$$\hat{g}_\ell = \frac{(\hat{p} \otimes \hat{a}) \odot \begin{bmatrix} e^{j\hat{\theta}_h} \\ e^{j\hat{\theta}_v} \end{bmatrix}}{\left\| (\hat{p} \otimes \hat{a}) \odot \begin{bmatrix} e^{j\hat{\theta}_h} \\ e^{j\hat{\theta}_v} \end{bmatrix} \right\|_2} \in \mathbb{C}^{2L}$$

Equation 21

Step II-5: Update the beamspace matrix for computing the ($\ell$+1)-th channel compressing vector using Equation 16, above.

Step III: Complete the channel compressing matrix, e.g., $G = [\hat{g}_1, \ldots, \hat{g}_{\hat{L}}] \in \mathbb{C}^{2L \times \hat{L}}$. And the second channel compressing procedure ends.

Figure 8:
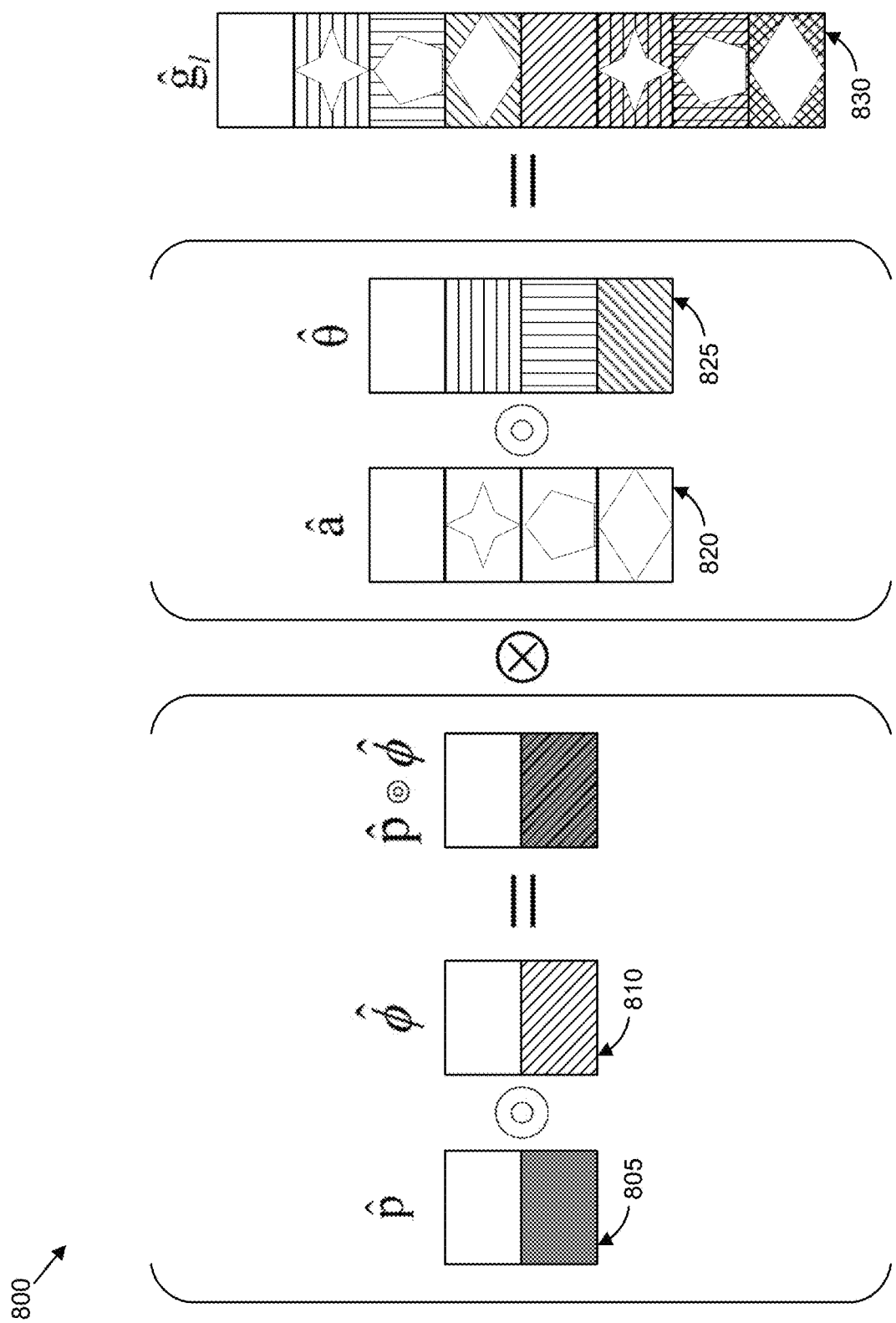
FIG. 8 is a diagram illustrating one embodiment of a graphical overview of a quantization approach of a third channel compressing procedure.

FIG. 8 depicts a graphical overview 800 of a quantization approach of a third channel compressing procedure. The third channel compression procedure is developed based on the assumptions that $\beta_\ell = \beta$ and $\theta_{v\ell} = \theta_{h\ell} + \phi$, for all $\ell = \{1, \ldots, \tilde{L}\}$. As $\beta_\ell$ represents the amplitude difference between the different polarizations, here it is assumed that the amplitude difference is common to all dominant beams. Also, the above assumes that there is a constant phase difference between the different polarizations for all dominant beams, here it is assumed that the amplitude difference is common to all beams.

Accordingly, the polarization column vector for the $\ell$-th dominant beam may be defined using equation 8, above. Moreover, the beamspace column vector in equation 9 may then be rewritten using equation 22 below:

$$h^{BS} = \begin{pmatrix} \begin{bmatrix} 1 \\ 0 \end{bmatrix} \otimes \left( \begin{bmatrix} \sqrt{\alpha_1} \\ \sqrt{\alpha_2} \\ \sqrt{\alpha_3} \\ \sqrt{\alpha_4} \end{bmatrix} \odot \begin{bmatrix} e^{j\theta_{h1}} \\ e^{j\theta_{h2}} \\ e^{j\theta_{h3}} \\ e^{j\theta_{h4}} \end{bmatrix} \right) + \\ \begin{bmatrix} 0 \\ \sqrt{\beta} \end{bmatrix} \otimes \left( \begin{bmatrix} \sqrt{\alpha_1} \\ \sqrt{\alpha_2} \\ \sqrt{\alpha_3} \\ \sqrt{\alpha_4} \end{bmatrix} \odot \begin{bmatrix} e^{j\theta_{h1}+\phi} \\ e^{j\theta_{h2}+\phi} \\ e^{j\theta_{h3}+\phi} \\ e^{j\theta_{h4}+\phi} \end{bmatrix} \right) \end{pmatrix}$$

$$= \left( \begin{bmatrix} 1 \\ \sqrt{\beta} \end{bmatrix} \odot \begin{bmatrix} 1 \\ e^{j\phi} \end{bmatrix} \right) \otimes \left( \begin{bmatrix} \sqrt{\alpha_1} \\ \sqrt{\alpha_2} \\ \sqrt{\alpha_3} \\ \sqrt{\alpha_4} \end{bmatrix} \odot \begin{bmatrix} e^{j\theta_{h1}} \\ e^{j\theta_{h2}} \\ e^{j\theta_{h3}} \\ e^{j\theta_{h4}} \end{bmatrix} \right)$$

$$= (p \odot e^{j\phi}) \otimes (a \odot e^{j\theta}) \in \mathbb{C}^{2L}$$

Equation 22

Here p denotes the polarization amplitude offset vector, $\phi$ denotes the polarization phase offset vector, a denotes the polarization-common amplitude vector (corresponding to the vertical and horizontal polarizations), and $\theta$ denotes the polarization-common phase vector. Based on the structure of the beamspace column vector, the channel compressing vectors may be quantized for each dominant beam, $\ell = \{1, \ldots, \tilde{L}\}$, such that $$\hat{g}_\ell = \frac{(\hat{p} \odot e^{j\hat{\phi}}) \otimes [\hat{a} \odot e^{j\hat{\theta}}]}{\|(\hat{p} \odot e^{j\hat{\phi}}) \otimes [\hat{a} \odot e^{j\hat{\theta}}]\|_2}$$

Equation 24

Here, $\hat{p} \in \mathbb{C}^2$ denotes the (unit-norm) quantized polarization-specific amplitude vector, $\hat{\phi} \in [0, 2\pi)^2$ denotes the (unit-norm) quantized polarization-specific phase vector, $\hat{a} \in \mathbb{C}^L$ denotes the (unit-norm) quantized polarization amplitude offset vector, and $\hat{\theta} \in [0, 2\pi)^L$ denotes the quantized phase offset vector. Note that the structure of the channel compressing vector is depicted in FIG. 5. Note that shapes within the boxes denote the amplitude of elements and shading patterns in the boxes denote the phase of elements.

Moreover, the third channel compressing procedure may include the following steps:

Step I: Initialize the beamspace matrix, e.g., $$H_1^{BS} = H^{BS} \in \mathbb{C}^{2N_{rx}W \times 2L}$$

Step II: Compute the channel compressing vectors iteratively for $\ell = 1:\tilde{L}$.

Step II-1: Reshape the beamspace matrix using equation 25:

$$\mathbf{H}_{\ell,reshape}^{BS} = \mathfrak{RES}_{(H^{BS})} \in \mathbb{C}^{4N_{rx}W \times L}$$

Equation 25

Step II-2: Compute the polarization-common right dominant singular vector using equation 26:

$$v_{reshape}^{opt} = \mathfrak{v}_1(\mathbf{H}_{\ell,reshape}^{BS}) \in \mathbb{C}^L$$

Equation 26

Here, we select an entry having the strongest amplitude among L entries in $v_{reshape}^{opt}$. The selected entry is the reference entry. The amplitude of the reference entry is assumed to be one and the phase of the reference entry is assumed to be zero. To simplify presentation and analysis, it is assumed that the first entry is selected as the reference entry in $v_{reshape}^{opt}$.

Step II-3: Quantize the sub-singular vectors.

Step II-3-A: Quantize the polarization-common phases of the sub-singular vector 825:

$$\hat{\theta} = \underset{\tilde{\theta} \in C_{phase}^L}{\operatorname{argmin}} \|\tilde{\theta} - \angle v_{reshape}^{opt}\|_2^2 \in [0, 2\pi)^L$$

Equation 27

In certain embodiments, the global phase codebook is defined as $C_{phase}^L = (\mathcal{Z}_B^{phase})^L$. In one embodiment, the phase codebook includes $2^B$ phase entries, such that $\mathcal{Z}_B^{phase} = \{0, \ldots, 2\pi(2^B-1)/2^B\}$ Step II-3-B: Quantize the polarization-common amplitudes of the sub-singular vector 820 using equation 27, below.

$$\hat{a} = \underset{\tilde{a} \in C_{amp}^L}{\operatorname{argmax}} \left| (v_{reshape}^{opt})^H \left( \frac{\tilde{a}}{\|\tilde{a}\|_2} \odot e^{j\hat{\theta}} \right) \right|^2 \in \mathbb{C}^L$$

Equation 27

In certain embodiments, the global amplitude codebook is defined as $C_{amp}^L = (\mathcal{Z}_B^{amp})^L$. In one embodiment, the amplitude codebook includes $2^B$ amplitude entries and is defined in half-power decreasing steps (relative to the reference entry) by $\mathcal{Z}_B^{amp} = \{(1/\sqrt{2})^0, (1/\sqrt{2})^1, \ldots, (1/\sqrt{2})^{2^B-1}\}$.

Step II-4: Quantize the polarization amplitude offset 805 and phase offset 810 vectors:

$$\{\hat{p}, \hat{\phi}\} = \underset{\tilde{p} \in C_{pol,amp}^2, \tilde{\phi} \in C_{phase}^2}{\operatorname{argmax}} \left| (v^{opt})^H \left( \left( \frac{\tilde{p}}{\|\tilde{p}\|_2} \odot e^{j\tilde{\phi}} \right) \otimes (\hat{a} \odot e^{j\hat{\theta}}) \right) \right|^2 \in \mathbb{C}^2$$

Equation 29

In certain embodiments, the global amplitude codebook for polarization vector is defined as $C_{pol,amp}^L = (\mathcal{Z}_B^{pol,amp})^L$. In one embodiment, the amplitude codebook for polarization vector includes $2^B$ amplitude entries and is defined in three-quarter-power decreasing steps (relative to the reference entry) by $\mathcal{Z}_B^{pol,amp} = \{(\sqrt{3/4})^0, (\sqrt{3/4})^1, \ldots, (\sqrt{3/4})^{2^B-1}\}$.

Here, the dominant polarization is selected between horizontal and vertical polarizations. The phases for the dominant polarization is assumed to be zero in $\mathcal{Z}_B^{phase}$ and the amplitudes for the dominant polarization is assumed to be one in $\mathcal{Z}_B^{pol,amp}$.

Step II-5: Compute the $\ell$-th channel compressing vector 830 using:

$$\hat{g}_\ell = \frac{(\hat{p} \odot e^{j\hat{\phi}}) \otimes [\hat{a} \odot e^{j\hat{\theta}}]}{\|(\hat{p} \odot e^{j\hat{\phi}}) \otimes [\hat{a} \odot e^{j\hat{\theta}}]\|_2} \in \mathbb{C}^{2L} \quad \text{Equation 30}$$

Step II-6: Update the beamspace matrix for computing the $(\ell+1)$-th channel compressing vector using equation 16.

Step III: Complete the channel compressing matrix $G = [\hat{g}_1, \ldots, \hat{g}_{\tilde{L}}] \in \mathbb{C}^{2L \times \tilde{L}}$. And the third channel compressing procedure ends.

It is essential to develop CSI quantizers suitable for the proposed channel compressing algorithm described above. Before designing practical quantizers, it should be noted that the channel compression vectors in the channel compression matrix $G_r$ are semi-orthogonal (e.g., not perfectly orthogonal) because it may not be possible to properly quantize the right singular vectors of $H_r^{comp}$. To compute the Type II CSI by considering the semi-orthogonal property of the channel compressing matrix, compute a $\tilde{L}$-dimensional (unit norm) basis combining vector $\tilde{w}$ in SB, which maximizes the argument $$\left| \frac{H_r^{BS} G_r \tilde{w}}{\|G_r \tilde{w}\|_2} \right|^2.$$

The optimal basis combining vector is then computed using equation 31 below:

$$w_r^{opt} = \underset{\tilde{w} \in \mathbb{C}^{\tilde{L}}}{\arg\max} \left| \frac{H_r^{BS} G_r \tilde{w}}{\|G_r \tilde{w}\|_2} \right|^2 \quad \text{Equation 31}$$

$$= \underset{\tilde{w} \in \mathbb{C}^{\tilde{L}}}{\arg\max} \frac{\tilde{w}^H (H_r^{BS} G_r)^H H_r^{BS} G_r \tilde{w}}{\tilde{w}^H G_r^H G_r \tilde{w}}$$

$$\stackrel{(a)}{=} e_{max}((G_r^H G_r)^{-1} (H_r^{BS} G_r)^H H_r^{BS} G_r),$$

where (a) is derived based on the generalized Rayleigh quotient. Based on the optimal basis combining vector, suitable quantization approaches are described with reference to FIGS. 9 and 10.

FIG. 9 illustrates an algorithm 900 for a wideband quantizer based on a channel compressing procedure, according to embodiments of the disclosure. We first develop a WB quantizer and the details are summarized in the algorithm depicted in FIG. 9. Based on the proposed channel compression algorithm, the beamspace matrix is compressed with $G_r$, as shown in the line 3 of the wideband quantizer algorithm 900. To compute WB PMI, we should quantize the $\tilde{L}$-dimensional right singular vector of the compressed channel matrix in Equation 6, instead of quantizing the 2L-dimensional right singular vector of the beamspace channel matrix, as proposed in the current Type II codebook. To consider the loss due to the correlations between column vectors in $G_r$, the target combining vector may be computed based on the derivation in equation 31, as summarized in the line 4 of the wideband quantizer algorithm. The amplitudes of the $\tilde{L}$-dimensional target basis combining vector may then be quantized. The details of the vector quantization technique are summarized in the lines 5-6 of the wideband quantizer algorithm 900.

Note that the quantized basis combining vector $w_r$ is the $\tilde{L}$-dimensional column vector, while the dimension of the beamspace matrix $H_r^{BS}$ is $2N_{rx}W \times 2L$. To update the beamspace matrix for the (r+1)-th transmission layer, the compressed combining vector $w_r$ should be expanded to $V_r$, as proposed in the line 7 of the wideband quantizer algorithm 900. The beamspace matrix for the following transmission layer is then updated by projecting out $v_r$ from the $H_r^{BS}$, as shown in the line 8 of the wideband quantizer algorithm 900.

FIG. 10 illustrates an algorithm for a subband quantizer based on a channel compressing procedure, according to embodiments of the disclosure. We next develop SB quantizer and the details are summarized in the subband quantizer algorithm 1000. Because compressing vectors in $G_r$ are not perfectly orthogonal, the target combining vector may be computed based on the derivation in equation 31, as in the line 4 of the subband quantizer algorithm 1000.

After computing target (compressed) basis vector in line 4, we then quantize its amplitudes and phases. Note that the details are summarized in the lines 5-7 of the subband quantizer algorithm 1000.

Note that the quantized basis combining vector $w_r[s]$ is the $\tilde{L}$-dimensional column vector, while the dimension of the beamspace matrix $H_r^{BS}[s]$ is $2N_{rx}W/S \times 2L$. To update the beamspace matrix for the (r+1)-th transmission layer, the compressed combining vector $w_r[s]$ should be expanded to $V_r[s]$, as shown in the line 8 of the subband quantizer algorithm 1000. The beamspace matrix for the following transmission layer is then updated by projecting out $v_r[s]$ from the $H_r^{BS}[s]$, as shown in the line 8 of the subband quantizer algorithm 1000.

After collecting WB and SB PMI from users, the transmitter computes beamforming vectors. Note that the details are summarized in lines 13-14 of the subband quantizer algorithm 1000.

The proposed quantizers may be operated in conjunction with the current Type II CSI codebook. In this case, WB and SB PMI for rank 1-2 beamformers are computed based on the Type II codebook while that for rank 3-4 beamformers may be computed based on the proposed CSI quantizers in Algorithms 900 and 1000.

Figure 11B:
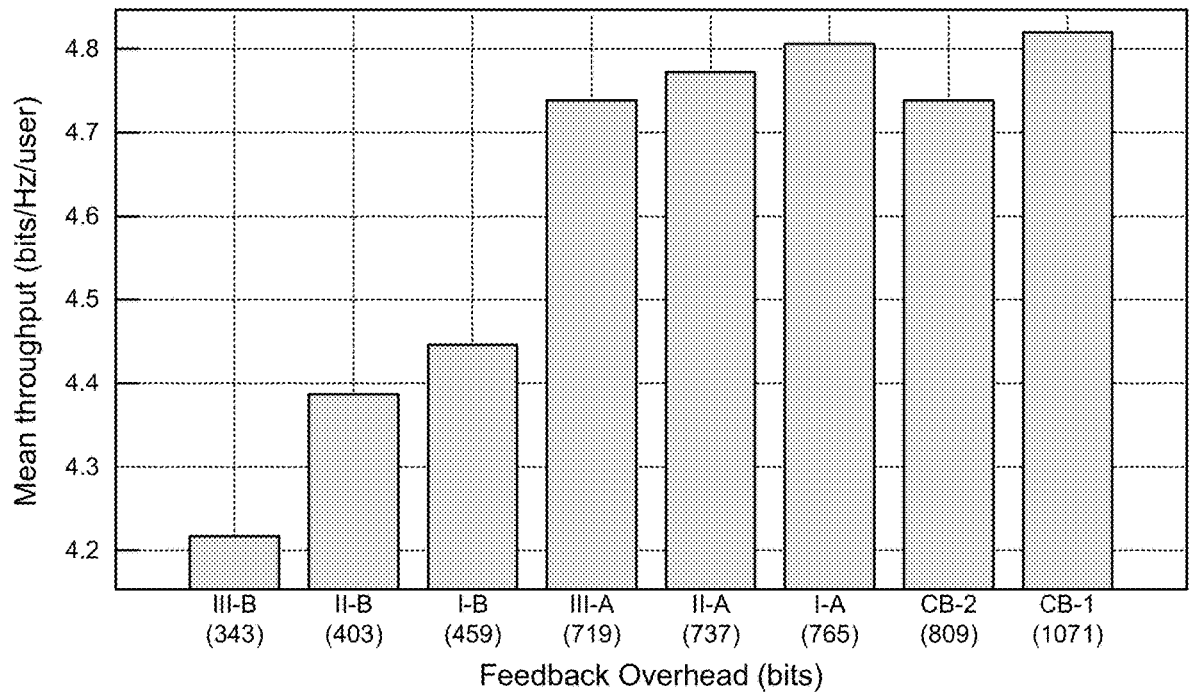
FIG. 11B is a diagram illustrating one embodiment of mean throughput performance of CSI codebooks for $\lambda_{traffic}=3.5$.
Figure 11C:
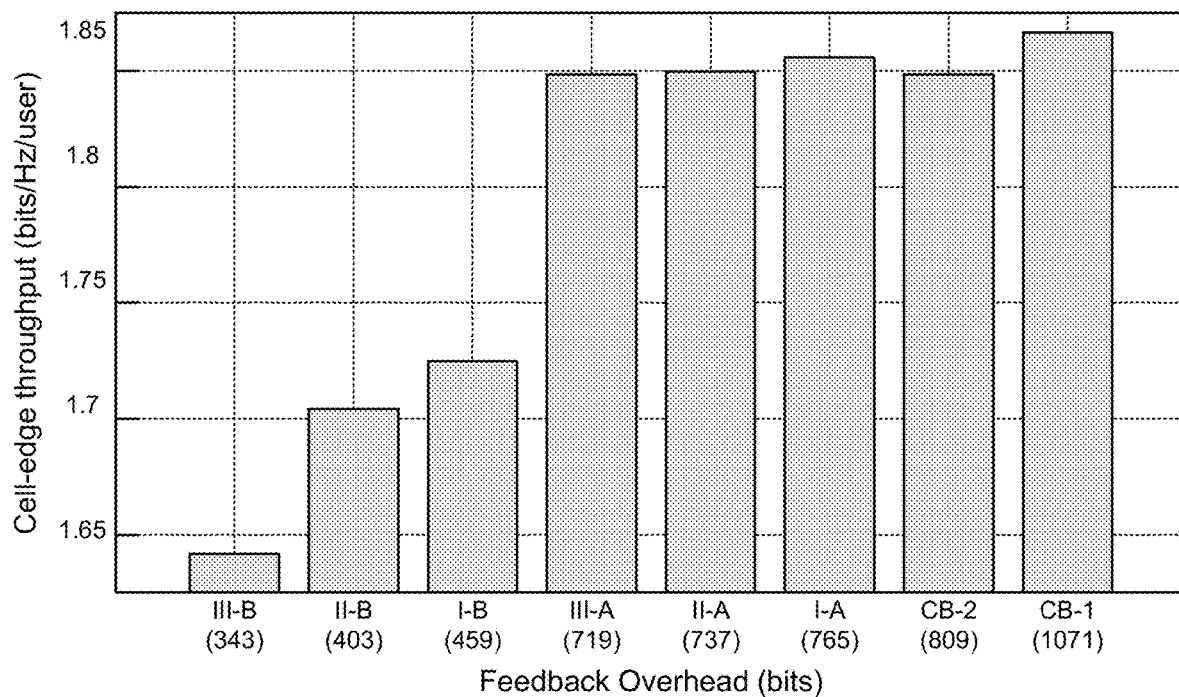
FIG. 11C is a diagram illustrating one embodiment of cell-edge throughput performance of CSI codebooks for $\lambda_{traffic}=3.5$.
Figure 12B:
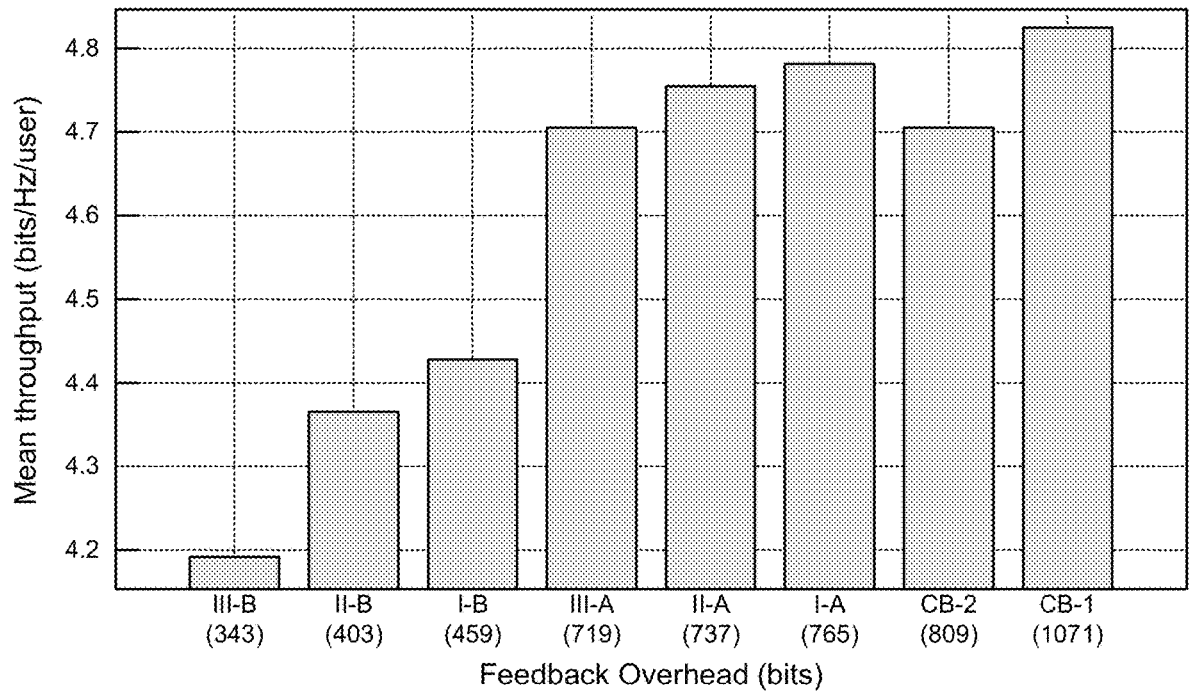
FIG. 12B is a diagram illustrating another embodiment of mean throughput performance of CSI codebooks for $\lambda_{traffic}=2.0$.
Figure 12C:
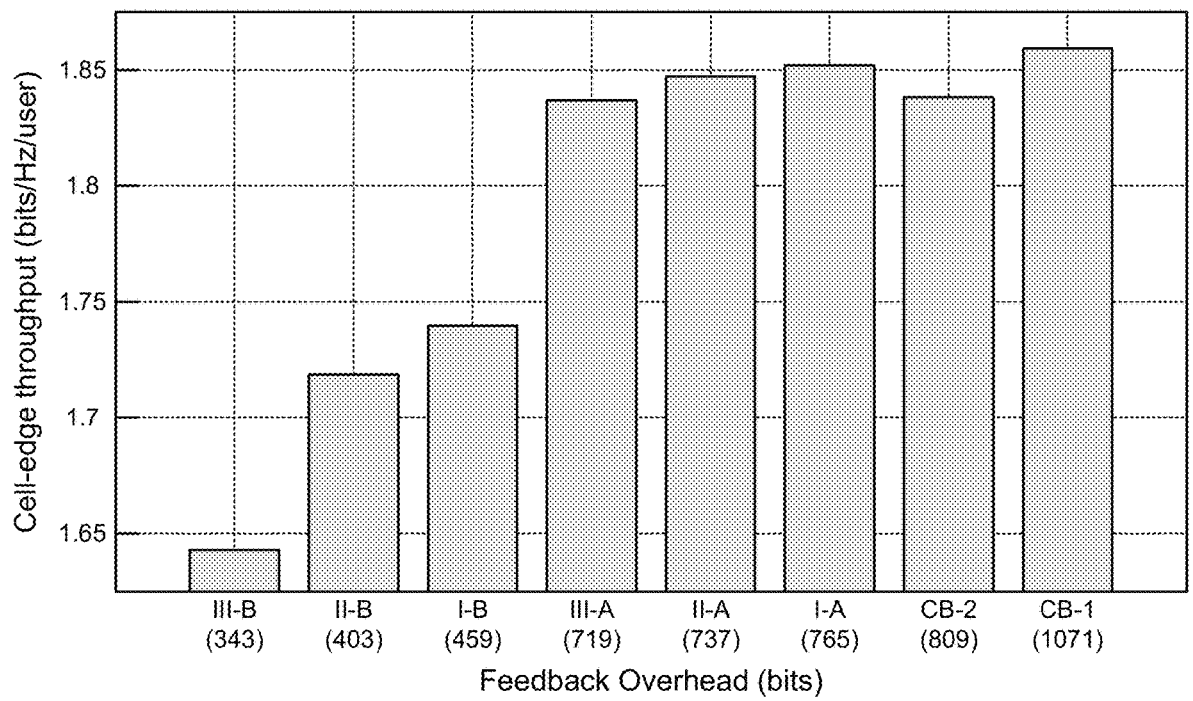
FIG. 12C is a diagram illustrating another embodiment of cell-edge throughput performance of CSI codebooks for $\lambda_{traffic}=2.0$.

FIGS. 11A and 12A are diagrams illustrating data rate performance of CSI codebooks, according to embodiments of the disclosure. FIGS. 11B and 12B are diagrams illustrating mean throughput performance of CSI codebooks, according to embodiments of the disclosure. FIGS. 11C and 12C are diagrams illustrating cell-edge throughput performance of CSI codebooks, according to embodiments of the disclosure.

Referring to FIGS. 11A-C and 12A-C, we evaluate cell-edge and mean throughput performances of the proposed rank 1-4 CSI codebooks in Table 1. The codebook 1 (reference codebook) is developed based on the Type II CSI codebook in 3GPP R1-1709232 and the codebook 2 is proposed in 3GPP R1-1710674. The codebooks I, II, and III are developed based on the first channel compressing method, the second channel compressing method, and the third channel compressing method, respectively. For numerical simulations, system level simulations are conducted with 40 drops and 15,000 TTIs. Moreover, we consider 3D Urban Micro ("UMi") channel scenario, 32 port (4,4,2) antenna configurations, and a non-full buffer traffic scenario with parameters $\lambda_{traffic} = 3.5$.

TABLE 1

CSI codebooks for system level simulations

| Codebook 1 | Rank 1-4 Type II CSI codebook in 3GPP R1-1709232 |
|---|---|
| Codebook 2 | Rank 1-2 Type II CSI codebook & Rank 3-4 CSI codebook in 3GPP R1-1710674 |
| Proposed codebook I-A | Rank 1-2 Type II CSI codebook & Rank 3-4 CSI codebook with the first channel compressing method |
| Proposed codebook II-A | Rank 1-2 Type II CSI codebook & Rank 3-4 CSI codebook with the second channel compressing method |
| Proposed codebook III-A | Rank 1-2 Type II CSI codebook & Rank 3-4 CSI codebook with the third channel compressing method |
| Proposed codebook I-B | Rank 1-4 CSI codebook with the first channel compressing method |
| Proposed codebook II-B | Rank 1-4 CSI codebook with the second channel compressing method |
| Proposed codebook III-B | Rank 1-4 CSI codebook with the third channel compressing method |

The cell-edge and mean throughput results are presented in FIGS. 11A and 12A. In the x-axis of the FIGS. 11B-C and 12B-C, the codebooks are organized in an ascending order of the total feedback overhead. The codebook 1 (reference codebook) provides the best cell-edge and mean throughput at the expense of exorbitant feedback overhead.

In the quantization scheme A, only the rank 3-4 beamformers are computed based on the proposed channel compressing methods. In FIG. 11A-C, which consider the traffic scenario $\lambda_{traffic}$=3.5, the proposed codebooks I-A, II-A, III-A obtain 28.57%, 31.19%, and 32.87% feedback overhead reductions compared to the codebook 1 with only 0.26% (0.91%), 0.96% (1.44%), and 1.78% (2.53%) mean throughput degradation, respectively.

In the quantization scheme B, all of the rank 1-4 beamformers are computed based on the proposed channel compressing methods. In FIGS. 12A-C, which consider the traffic scenario $\lambda_{traffic}$=2.0, the proposed codebooks I-B, II-B, III-B obtain 57.14%, 62.37%, and 67.97% feedback overhead reductions compared to the codebook 1 with 7.69% (8.25%), 9.08% (9.57%), and 12.56% (13.17%) mean throughput degradation, respectively.

FIGS. 11A-C and 12A-C also show that the proposed codebooks I-A and II-A provide better cell-edge mean throughput performances than codebook 2 in 3GPP R1-1710674 with less feedback overhead in both traffic scenarios, e.g., $\lambda_{traffic}$=3.5 and $\lambda_{traffic}$=2.0. In addition, the cell-edge mean throughput performances of the proposed codebook III-A are similar to that of codebook 2 in 3GPP R1-1710674, while the feedback overhead the proposed codebook III-A is much lesser than that of codebook 2.

FIGS. 13A-H illustrate feedback overhead for varies codebooks, according to embodiments disclosure. Here, we calculate feedback overhead of CSI codebooks in Table 1. Note that we consider L=4 beam selection, S=10 SBs, and R=4 maximum transmission layers.

FIG. 13A shows a table that summarizes feedback overhead of the Codebook 1 for rank 1-4 transmissions. Considering S=10 and R=4, the total feedback overhead is given by equation 33:

$$B_{Codebook\_1}^{total}=15+24R+24RS=1071 \text{ (bits)} \quad \text{Equation 33}$$

FIG. 13B shows a table that summarizes feedback overhead of the Codebook 2 for rank 1-4 transmissions. Considering S=10 and R=4, the total feedback overhead is given by equation 34:

$$B_{Codebook\_2}^{total}=15+18.5R+18RS=809 \text{ (bits)} \quad \text{Equation 34}$$

FIG. 13C shows a table that summarizes feedback overhead of the Codebook I-A for rank 1-4 transmissions. Considering S=10, R=4, and $\tilde{L}$=2, the total feedback overhead is given by equation 35:

$$B_{Codebook\_IA}^{total}=15+47.5R+14RS=765 \text{ (bits)} \quad \text{Equation 35}$$

FIG. 13D shows a table that summarizes feedback overhead of the Codebook II-A for rank 1-4 transmissions. Considering S=10, R=4, and $\tilde{L}$=2, the total feedback overhead is given by equation 36:

$$B_{Codebook\_IIA}^{total}=15+40.5R+14RS=737 \text{ (bits)} \quad \text{Equation 36}$$

FIG. 13E shows a table that summarizes feedback overhead of the Codebook III-A for rank 1-4 transmissions. Considering S=10, R=4, and $\tilde{L}$=4, the total feedback overhead is given by equation 37:

$$B_{Codebook\_IIIA}^{total}=15+33R+14RS=719 \text{ (bits)} \quad \text{Equation 37}$$

FIG. 13F shows a table that summarizes feedback overhead of the Codebook I-B for rank 1-4 transmissions. Considering S=10, R=4, and $\tilde{L}$=2, the total feedback overhead is given by equation 38:

$$B_{Codebook\_IB}^{total}=15+71R+4RS=459 \text{ (bits)} \quad \text{Equation 38}$$

FIG. 13G shows a table that summarizes feedback overhead of the Codebook II-B for rank 1-4 transmissions. Considering S=10, R=4, and $\tilde{L}$=2, the total feedback overhead is given by equation 39:

$$B_{Codebook\_IIB}^{total}=15+57R+4RS=403 \text{ (bits)} \quad \text{Equation 39}$$

FIG. 13H shows a table that summarizes feedback overhead of the Codebook III-B for rank 1-4 transmissions. Considering S=10, R=4, and $\tilde{L}$=4, the total feedback overhead is given by equation 40:

$$B_{Codebook\_IIIB}^{total}=15+42R+4RS=343 \text{ (bits)} \quad \text{Equation 40}$$

Table 2 shows the simulation assumptions used in the above.

TABLE 12

Simulation parameters

| | |
|---|---|
| Channel model | 3D UMi 200 m ISD |
| eNB height | 10 m |
| Carrier frequency | 2 GHz |
| Bandwidth | 10 MHz |
| Oversampling $(O_1, O_2)(O_1, O_2)$ | (4.4) |
| eNB antenna configurations (H, V) × ($N_1$, $N_2$, P) ($N_1$, $N_2$, P) | 32 ports: (4. 8) × (4, 4, 2) with (1 × 2) 1 × 2 virtualization, 108° tilt |
| UE antenna configurations | 4 UE antennas: (2, 1, 2), $d_v$ = 0.8λ |
| Antenna polarizations | eNB (+45°, −45°) UE (0°, 90°) |
| eNB antenna spacing ($d_h$, $d_v$) | (0.5. 0.8)λ |
| eNB power | 41 dBm (UMi) |
| Cell layout | 57 cells |
| Traffic model | FTP Traffic Model 1, Non full buffer ($\lambda_{traffic}$ = 2, 3.5, 500 kB packet size) |
| Scheduling | MU, Proportional fair, Max 8 MU layers |
| HARQ | Max 4 retransmission |
| CSI mode | PUSCH mode 3-2 |
| CSI periodicity and CSI delay | 5 ms |
| UE speed | 3 km/h |
| Target BLER | 0.1 |
| Receiver | MMSE-IRC |
| Transmission layer | 1-4 |

Figure 14:
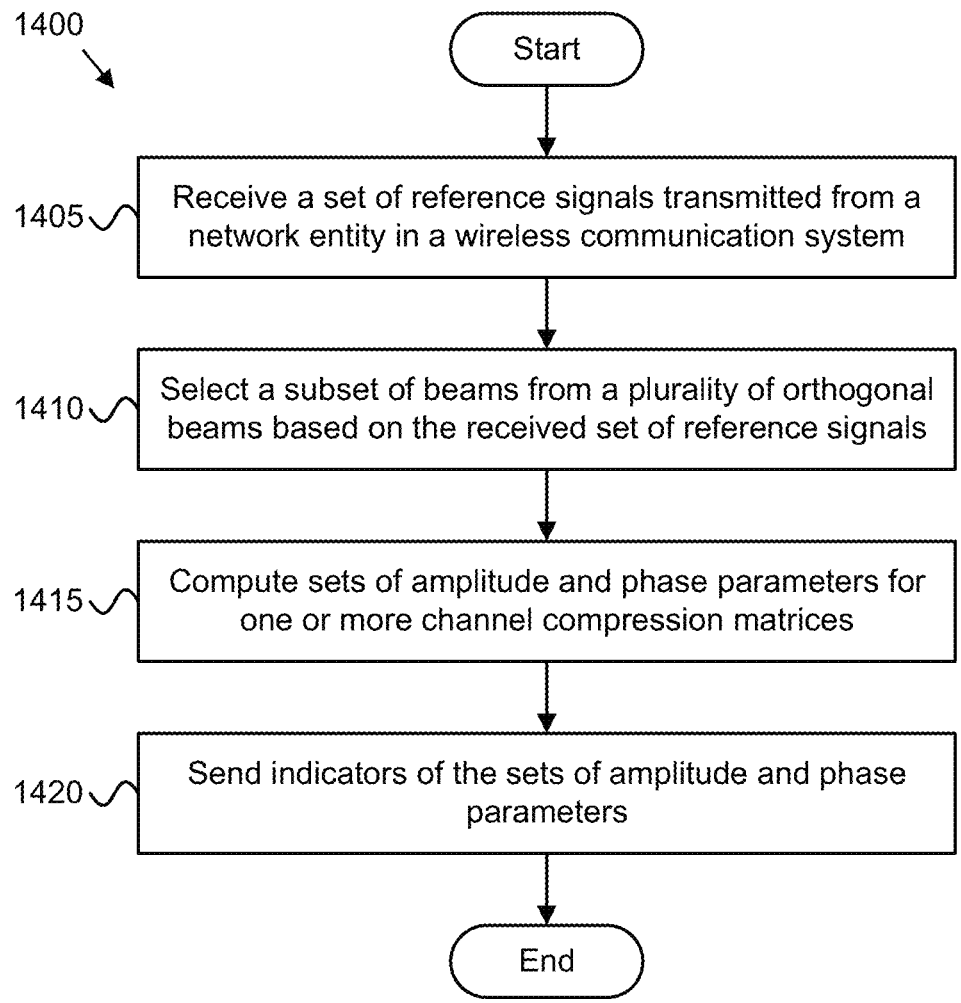
FIG. 14 is a schematic flow chart diagram illustrating one embodiment of a method for coding a CSI codebook and preparing a codeword therefrom.

FIG. 14 depicts a method 1400 for efficiently coding a CSI codebook and preparing a codeword therefrom, according to embodiments of the disclosure. In some embodiments, the method 1400 is performed by an apparatus, such as the remote unit 105, the UE 205, and/or the user equipment apparatus 500. In certain embodiments, the method 1400 may be performed by a processor executing program code, for example, a microcontroller, a microprocessor, a CPU, a GPU, an auxiliary processing unit, a FPGA, or the like.

The method 1400 begins with receiving 1405 a set of reference signals transmitted from a transmission point. Here, the transmission point may be a network entity in a radio access network, such as the base unit 110 and/or the gNB 210. The method 1400 includes selecting 1410 a subset of beams from a plurality of orthogonal beams.

The method 1400 includes computing 1415 sets of amplitude and phase parameters for one or more channel compression matrices. Here, each channel compression matrix corresponds to one transmission layer of the multiple-layer transmission. Moreover, each channel compression matrix is comprised of one or more column vectors.

The method 1400 includes sending 1420 the amplitude and phase parameters to a network node. Here, the network node may be a base station, such as the base unit 110 and/or the gNB 210. The method 1400 ends.

Figure 15:
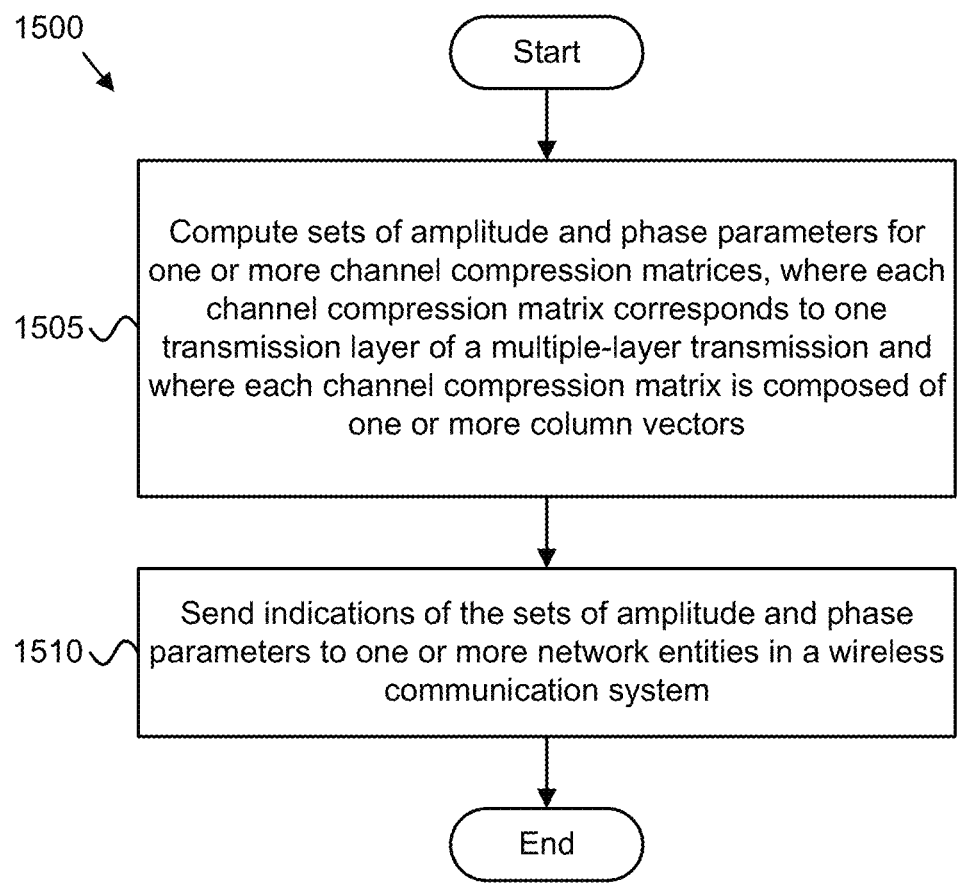
FIG. 15 is a schematic flow chart diagram illustrating one embodiment of a method for providing high-resolution CSI feedback.

FIG. 15 depicts a method 1500 for providing high-resolution CSI feedback, according to embodiments of the disclosure. In some embodiments, the method 1500 is performed by an apparatus, such as the remote unit 105, the UE 205, and/or the user equipment apparatus 500. In certain embodiments, the method 1500 may be performed by a processor executing program code, for example, a microcontroller, a microprocessor, a CPU, a GPU, an auxiliary processing unit, a FPGA, or the like.

The method 1500 begins with computing 1505 sets of amplitude and phase parameters for at least one channel compression matrix. Here, each channel compression matrix corresponds to one transmission layer of a multiple-layer transmission. Further, each channel compression matrix is composed of at least one column vector.

The method 1500 includes sending 1510 indications of the sets of amplitude and phase parameters to at least one network entity in a wireless communication system. Here, the at least one network entity may be a base station, such as the base unit 110 and/or the gNB 210. The method 1500 ends.

Disclosed herein is a first apparatus for efficiently providing high-resolution CSI feedback. The first apparatus may be a wireless device, such as a remote unit 105, the UE 205, and/or user equipment apparatus 500. The first apparatus includes a processor that computes sets of amplitude and phase parameters for one or more channel compression matrices, where each channel compression matrix corresponds to one transmission layer of a multiple-layer transmission and where each channel compression matrix is comprised of one or more column vectors. The first apparatus includes a radio transceiver that sends indications of the sets of amplitude and phase parameters to one or more network entities is a mobile communication network. Here, the at least one network entity may be a base station, such as the base unit 110 and/or the gNB 210.

In various embodiments, each set of amplitude and phase parameters parameterizes one column of the channel compression matrix. In some embodiments, the transceiver receives a set of reference signals transmitted from a transmission point. Here, the transmission point may be a network entity in a radio access network, such as the base unit 110 and/or the gNB 210. In such embodiments, the processor may select a subset of beams from a plurality of orthogonal beams based on the received set of reference signals. Note that the transmission point may be a different network entity than the one to which indications of the sets of amplitude and phase parameters are sent. In various embodiments, the number of column vectors which compose each channel compression matrix is less than the number of beams in the selected subset of beams.

In some embodiments, the sets of amplitude and phase parameters include a set of polarization-specific amplitude coefficient parameters, a set of polarization-specific phase coefficient parameters, and a set of polarization amplitude coefficient parameters. In such embodiments, the polarization-specific amplitude coefficient parameters form a polarization-specific amplitude vector, the polarization-specific phase coefficient parameters form a polarization-specific phase vector, and the polarization amplitude offset coefficient parameters form a polarization amplitude vector.

In certain embodiments, the processor may identify a largest polarization-specific amplitude coefficient parameter of the polarization-specific amplitude coefficient parameters for each polarization. Here, the largest polarization-specific amplitude coefficient parameter becomes a reference entry for that polarization. The processor may further quantize, for each polarization, all other polarization-specific amplitude coefficient parameters for that polarization relative to the reference entry for that polarization.

In certain embodiments, the processor may identify a largest polarization amplitude offset coefficient parameter of the polarization-specific amplitude offset coefficient parameters for each polarization. Here, the largest polarization amplitude offset coefficient parameter becomes a reference entry for that polarization. The processor may further quantize, for each polarization, all other polarization amplitude offset coefficient parameters for that polarization relative to the reference entry for that polarization.

In some embodiments, the sets of amplitude and phase parameters include a set of polarization-common amplitude coefficient parameters, a set of polarization-specific phase coefficient parameters, and a set of polarization amplitude offset coefficient parameters. In such embodiments, the polarization-common amplitude coefficient parameters form a polarization-common amplitude vector, the polarization-specific phase coefficient parameters form a polarization-specific phase vector, and the polarization amplitude offset coefficient parameters form a polarization amplitude vector.

In certain embodiments, the processor may identify a largest polarization-common amplitude coefficient parameter of the polarization-common amplitude coefficient parameters for each polarization. Here, the largest polarization-common amplitude coefficient parameter becomes a reference entry for that polarization. The processor may further quantize, for each polarization, all other polarization-common amplitude coefficient parameters for that polarization relative to the reference entry for that polarization.

In certain embodiments, the processor may identify a largest polarization amplitude offset coefficient parameter of the polarization-specific amplitude coefficient parameters for each polarization. Here, the largest polarization amplitude offset coefficient parameter becomes a reference entry for that polarization. The processor may further quantize, for each polarization, all other polarization amplitude offset coefficient parameters for that polarization relative to the reference entry for that polarization.

In some embodiments, the sets of amplitude and phase parameters include a set of polarization-common amplitude coefficient parameters, a set of polarization-common phase coefficient parameters, a set of polarization amplitude offset coefficient parameters, and a set of polarization phase offset coefficient parameters. In such embodiments, the polarization-common amplitude coefficient parameters form a polarization-common amplitude vector, wherein the polarization-common phase coefficient parameters form a polarization-common phase vector, wherein the polarization amplitude offset coefficient parameters form a polarization amplitude vector, and wherein the polarization phase offset coefficient parameters form a polarization phase vector.

In certain embodiments, the processor may identify a largest polarization-common amplitude coefficient parameter of the polarization-common amplitude coefficient parameters for each polarization. Here, the largest polarization-common amplitude coefficient parameter becomes a reference entry for that polarization. The processor may further quantize, for each polarization, all other polarization-common amplitude coefficient parameters for that polarization relative to the reference entry for that polarization.

In certain embodiments, the processor may identify a largest polarization amplitude offset coefficient parameter of the polarization-specific amplitude coefficient parameters for each polarization. Here, the largest polarization amplitude offset coefficient parameter becomes a reference entry for that polarization. The processor may further quantize, for each polarization, all other polarization amplitude offset coefficient parameters for that polarization relative to the reference entry for that polarization.

Disclosed herein is a first method for efficiently providing high-resolution CSI feedback. The first method may be performed by a wireless device, such as a remote unit 105, the UE 205, and/or user equipment apparatus 500. The first method includes computing sets of amplitude and phase parameters for one or more channel compression matrices, where each channel compression matrix corresponds to one transmission layer of a multiple-layer transmission and where each channel compression matrix is comprised of one or more column vectors. The first method includes indications of the sets of amplitude and phase parameters to one or more network entities is a mobile communication network. Here, the at least one network entity may be a base station, such as the base unit 110 and/or the gNB 210.

In various embodiments, each set of amplitude and phase parameters parameterizes one column of the channel compression matrix. In some embodiments, the first method includes receiving a set of reference signals transmitted from a transmission point. Here, the transmission point may be a network entity in a radio access network, such as the base unit 110 and/or the gNB 210. In such embodiments, the first method further includes selecting a subset of beams from a plurality of orthogonal beams based on the received set of reference signals. Note that the transmission point may be a different network entity than the one to which indications of the sets of amplitude and phase parameters are sent. In various embodiments, the number of column vectors which compose each channel compression matrix is less than the number of beams in the selected subset of beams.

In some embodiments, the sets of amplitude and phase parameters include a set of polarization-specific amplitude coefficient parameters, a set of polarization-specific phase coefficient parameters, and a set of polarization amplitude offset coefficient parameters. In such embodiments, the polarization-specific amplitude coefficient parameters form a polarization-specific amplitude vector, the polarization-specific phase coefficient parameters form a polarization-specific phase vector, and the polarization amplitude offset coefficient parameters form a polarization amplitude vector.

In certain embodiments, the first method may include identifying a largest polarization-specific amplitude coefficient parameter of the polarization-specific amplitude coefficient parameters for each polarization. Here, the largest polarization-specific amplitude coefficient parameter becomes a reference entry for that polarization. The first method further includes quantizing, for each polarization, all other polarization-specific amplitude coefficient parameters for that polarization relative to the reference entry for that polarization.

In certain embodiments, the first method may include identifying a largest polarization amplitude offset coefficient parameter of the polarization-specific amplitude offset coefficient parameters for each polarization. Here, the largest polarization amplitude offset coefficient parameter becomes a reference entry for that polarization. The first method further includes quantizing, for each polarization, all other polarization amplitude offset coefficient parameters for that polarization relative to the reference entry for that polarization.

In some embodiments, the sets of amplitude and phase parameters include a set of polarization-common amplitude coefficient parameters, a set of polarization-specific phase coefficient parameters, and a set of polarization amplitude offset coefficient parameters. In such embodiments, the polarization-common amplitude coefficient parameters form a polarization-common amplitude vector, the polarization-specific phase coefficient parameters form a polarization-specific phase vector, and the polarization amplitude offset coefficient parameters form a polarization amplitude vector.

In certain embodiments, the first method may include identifying a largest polarization-common amplitude coefficient parameter of the polarization-common amplitude coefficient parameters for each polarization. Here, the largest polarization-common amplitude coefficient parameter becomes a reference entry for that polarization. The first method further includes quantizing, for each polarization, all other polarization-common amplitude coefficient parameters for that polarization relative to the reference entry for that polarization.

In certain embodiments, the first method may include identifying a largest polarization amplitude offset coefficient parameter of the polarization-specific amplitude coefficient parameters for each polarization. Here, the largest polarization amplitude offset coefficient parameter becomes a reference entry for that polarization. The first method further includes quantizing, for each polarization, all other polarization amplitude offset coefficient parameters for that polarization relative to the reference entry for that polarization.

In some embodiments, the sets of amplitude and phase parameters include a set of polarization-common amplitude coefficient parameters, a set of polarization-common phase coefficient parameters, a set of polarization amplitude offset coefficient parameters, and a set of polarization phase offset coefficient parameters. In such embodiments, the polarization-common amplitude coefficient parameters form a polarization-common amplitude vector, wherein the polarization-common phase coefficient parameters form a polarization-common phase vector, wherein the polarization amplitude offset coefficient parameters form a polarization amplitude vector, and wherein the polarization phase offset coefficient parameters form a polarization phase vector.

In certain embodiments, the first method may include identifying a largest polarization-common amplitude coefficient parameter of the polarization-common amplitude coefficient parameters for each polarization. Here, the largest polarization-common amplitude coefficient parameter becomes a reference entry for that polarization. The first method further includes quantizing, for each polarization, all other polarization-common amplitude coefficient parameters for that polarization relative to the reference entry for that polarization.

In certain embodiments, the first method may include identifying a largest polarization amplitude offset coefficient parameter of the polarization-specific amplitude coefficient parameters for each polarization. Here, the largest polarization amplitude offset coefficient parameter becomes a reference entry for that polarization. The first method further includes quantizing, for each polarization, all other polarization amplitude offset coefficient parameters for that polarization relative to the reference entry for that polarization.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method in a wireless device comprising:
computing sets of amplitude and phase parameters for one or more channel compression matrices,
wherein each channel compression matrix corresponds to one transmission layer of a multiple-layer transmission,
wherein each channel compression matrix is composed of one or more column vectors; and
sending indications of the sets of amplitude and phase parameters to one or more network entities in a wireless communication system.

2. The method of claim 1, wherein a number of column vectors which compose each channel compression matrix is less than a number of beams based on a received set of reference signals from a network entity in the wireless communication system.

3. The method of claim 1, wherein each set of amplitude and phase parameters parameterizes one column of the channel compression matrix.

4. The method of claim 1, wherein the sets of amplitude and phase parameters comprise:
polarization-specific amplitude coefficient parameters,
polarization-specific phase coefficient parameters, and
polarization amplitude offset coefficient parameters.

5. The method of claim 1, wherein the sets of amplitude and phase parameters comprise:
polarization-common amplitude coefficient parameters,
polarization-specific phase coefficient parameters, and
polarization amplitude offset coefficient parameters.

6. The method of claim 1, wherein the sets of amplitude and phase parameters comprise:
polarization-common amplitude coefficient parameters,
polarization-common phase coefficient parameters,
polarization amplitude offset coefficient parameters, and
polarization phase offset coefficient parameters.

7. A wireless device comprising:
a processor that computes sets of amplitude and phase parameters for one or more channel compression matrices,
wherein each channel compression matrix corresponds to one transmission layer of a multiple-layer transmission,
wherein each channel compression matrix is comprised of one or more column vectors; and
a radio transceiver that sends indications of the sets of amplitude and phase parameters to one or more network entities i-s-in a mobile communication network.

8. The wireless device of claim 7, wherein each set of amplitude and phase parameters parameterizes one column of a channel compression matrix.

9. The wireless device of claim 7, wherein the sets of amplitude and phase parameters comprise:
polarization-specific amplitude coefficient parameters,
polarization-specific phase coefficient parameters, and
polarization amplitude offset coefficient parameters.

10. The wireless device of claim 9,
wherein the polarization-specific amplitude coefficient parameters form a polarization-specific amplitude vector,
wherein the polarization-specific phase coefficient parameters form a polarization-specific phase vector, and
wherein the polarization amplitude offset coefficient parameters form a polarization amplitude offset vector.

11. The wireless device of claim 9, further comprising:
identifying a largest polarization-specific amplitude coefficient parameter of the polarization-specific amplitude coefficient parameters for each polarization, wherein the largest polarization-specific amplitude coefficient parameter becomes a reference entry for that polarization; and
quantizing, for each polarization, all other polarization-specific amplitude coefficient parameters for that polarization relative to the reference entry for that polarization.

12. The wireless device of claim 9, further comprising:
identifying a largest polarization amplitude offset coefficient parameter of the polarization amplitude offset coefficient parameters for each polarization, wherein the largest polarization amplitude offset coefficient parameter becomes a reference entry for that polarization; and
quantizing, for each polarization, all other polarization amplitude offset coefficient parameters for that polarization relative to the reference entry for that polarization.

13. The wireless device of claim 7, wherein the sets of amplitude and phase parameters comprise:
polarization-common amplitude coefficient parameters,
polarization-specific phase coefficient parameters, and
polarization amplitude offset coefficient parameters.

14. The wireless device of claim 13,
wherein the polarization-common amplitude coefficient parameters form a polarization-common amplitude vector,
wherein the polarization-specific phase coefficient parameters form a polarization-specific phase vector, and
wherein the polarization amplitude offset coefficient parameters form a polarization amplitude offset vector.

15. The wireless device of claim 13, further comprising:
identifying a largest polarization-common amplitude coefficient parameter of the polarization-common amplitude coefficient parameters for each polarization, wherein the largest polarization-common amplitude coefficient parameter becomes a reference entry for that polarization; and
quantizing, for each polarization, all other polarization-common amplitude coefficient parameters for that polarization relative to the reference entry for that polarization.

16. The wireless device of claim 13, further comprising:
identifying a largest polarization amplitude offset coefficient parameter of the polarization amplitude offset coefficient parameters for each polarization, wherein the largest polarization amplitude offset coefficient parameter becomes a reference entry for that polarization; and
quantizing, for each polarization, all other polarization amplitude offset coefficient parameters for that polarization relative to the reference entry for that polarization.

17. The wireless device of claim 7, wherein the sets of amplitude and phase parameters comprise:
polarization-common amplitude coefficient parameters,
polarization-common phase coefficient parameters,
polarization amplitude offset coefficient parameters, and
polarization phase offset coefficient parameters.

18. The wireless device of claim 17, wherein the polarization-common amplitude coefficient parameters form a polarization-common amplitude vector,
wherein the polarization-common phase coefficient parameters form a polarization-common phase vector,
wherein the polarization amplitude offset coefficient parameters form a polarization amplitude offset vector, and
wherein the polarization phase offset coefficient parameters form a polarization phase vector.

19. The wireless device of claim 17, further comprising:
identifying a largest polarization-common amplitude coefficient parameter of the polarization-common amplitude coefficient parameters for each polarization, wherein the largest polarization-common amplitude coefficient parameter becomes a reference entry for that polarization; and
quantizing, for each polarization, all other polarization-common amplitude coefficient parameters for that polarization relative to the reference entry for that polarization.

20. The wireless device of claim 17, further comprising:
identifying a largest polarization amplitude offset coefficient parameter of the polarization amplitude offset coefficient parameters for each polarization, wherein the largest polarization amplitude offset coefficient parameter becomes a reference entry for that polarization; and
quantizing, for each polarization, all other polarization amplitude offset coefficient parameters for that polarization relative to the reference entry for that polarization.

* * * * *